(12) United States Patent
Jurmain et al.

(10) Patent No.: US 6,428,321 B1
(45) Date of Patent: Aug. 6, 2002

(54) INFANT SIMULATOR

(75) Inventors: Richard N. Jurmain; Mary M. Jurmain; Larry P. Blackledge, all of Eau Claire; Sheila R. Oium, Alma, all of WI (US); Adrian Pelkus, San Marcos, CA (US); Mary E. Rybarczyk, Baldwin, WI (US)

(73) Assignee: BTIO Educational Products, Inc., Eau Claire, WI (US)

( * ) Notice: Subject to any disclaimer, the term of this patent is extended or adjusted under 35 U.S.C. 154(b) by 0 days.

(21) Appl. No.: 08/986,835

(22) Filed: Dec. 8, 1997

(51) Int. Cl.$^7$ ................................................. A63H 3/28
(52) U.S. Cl. ........................ 434/238; 434/262; 446/297
(58) Field of Search ................................ 434/262, 267, 434/268, 395, 247, 365, 366, 396; 446/301, 302, 299, 268, 295, 297, 304, 305, 484

(56) References Cited

U.S. PATENT DOCUMENTS

| | | | |
|---|---|---|---|
| 2,781,611 A | * 2/1957 | Bills et al. ..................... | 46/135 |
| 2,818,678 A | 1/1958 | Lemelson | |
| 3,136,089 A | 6/1964 | Gardel et al. .................. | 46/232 |
| 3,162,980 A | 12/1964 | Hellman ...................... | 46/232 |
| 3,190,038 A | 6/1965 | Kardon ....................... | 46/232 |
| 3,234,687 A | 2/1966 | Elwell ......................... | 46/117 |
| 3,461,604 A | 8/1969 | Glass et al. ................... | 46/232 |
| 3,490,170 A | 1/1970 | Wolf ........................... | 46/117 |
| 3,514,899 A | 6/1970 | Bonanno et al. ............... | 46/232 |
| 3,641,703 A | 2/1972 | Tepper et al. ................. | 46/232 |
| 3,755,960 A | 9/1973 | Tepper et al. ................. | 46/118 |
| 3,758,983 A | 9/1973 | Cagen ......................... | 46/135 |
| 3,918,199 A | 11/1975 | De Masi ...................... | 46/247 |
| 4,075,782 A | 2/1978 | Neuschatz .................... | 46/118 |
| 4,115,948 A | 9/1978 | Burks .......................... | 46/141 |
| 4,160,338 A | 7/1979 | Lyons et al. ................... | 46/44 |
| 4,231,184 A | 11/1980 | Corris et al. .................. | 46/265 |

(List continued on next page.)

FOREIGN PATENT DOCUMENTS

| | | | | |
|---|---|---|---|---|
| AU | WO 89/01812 | * | 3/1989 | ................. 446/304 |
| GB | 2068245 | * | 8/1981 | ................. 446/305 |
| GB | 2068753 | * | 8/1981 | ................. 446/305 |
| GB | 2196545 A | * | 5/1988 | ................. 446/295 |
| WO | WO 98/59331 | | 12/1998 | |

OTHER PUBLICATIONS

Moran, "A chip off the ol' block: High–tech toys offer more," *The Hartford Courant*, Aug. 2, 1998, pp. 1–3.
Baby Think It Over Program™ Teacher's Handbook (Generation 4), 1996.

(List continued on next page.)

*Primary Examiner*—Joe H. Cheng
(74) *Attorney, Agent, or Firm*—Michael S. Sherrill

(57) ABSTRACT

An infant simulator capable of emulating the care requirements of an infant and recording the quality of care and responsiveness of a person caring for the infant simulator and/or signaling the person caring for the infant simulator when care is required. The infant simulator is capable of (i) sensing the environmental conditions of position, temperature and compression to which the infant simulator is subjected, and (ii) periodically demanding that the care-provider change the diaper, rock the infant, feeding the infant, or burp the infant simulator. The infant simulator is also programmed with the ancillary features of providing positive feedback when the proper interaction is provided in a timely fashion, an escalating demand signal when the proper interaction is not provided in a timely fashion, an identification system requiring the assigned care-provider to be present in order to satisfy a demand event, an unsatisfiable fussy period, and multiple behavior modes (i.e., differences in the frequency of the demand events and/or the duration of the demand events).

87 Claims, 13 Drawing Sheets

U.S. PATENT DOCUMENTS

| | | | |
|---|---|---|---|
| 4,249,338 A | | 2/1981 | Wexler .......................... 46/232 |
| 4,257,188 A | * | 3/1981 | Barker ....................... 446/295 |
| 4,318,245 A | | 3/1982 | Stowell et al. |
| 4,451,911 A | | 5/1984 | Klose et al. ................... 369/31 |
| 4,516,950 A | | 5/1985 | Berman et al. ............. 446/297 |
| 4,575,351 A | | 3/1986 | Gonzalez .................... 446/371 |
| 4,660,033 A | | 4/1987 | Brandt ................. 340/825.72 |
| 4,696,653 A | | 9/1987 | McKeffery .................. 446/175 |
| 4,710,145 A | | 12/1987 | Vandis ....................... 446/100 |
| 4,717,363 A | | 1/1988 | Refabert ...................... 446/14 |
| 4,740,186 A | | 4/1988 | Sirota ........................... 446/14 |
| 4,775,352 A | | 10/1988 | Curran et al. ............... 446/301 |
| 4,777,938 A | * | 10/1988 | Sirota ........................... 600/27 |
| 4,820,236 A | | 4/1989 | Berliner et al. ............. 446/369 |
| 4,840,602 A | | 6/1989 | Rose ............................ 446/175 |
| 4,846,693 A | | 7/1989 | Baer ........................... 434/308 |
| 4,904,988 A | | 2/1990 | Nesbit et al. |
| 4,923,428 A | * | 5/1990 | Curran ....................... 446/175 |
| 4,932,879 A | * | 6/1990 | Ingenito et al. ............. 434/262 |
| 5,011,449 A | | 4/1991 | Handy et al. ............... 446/297 |
| 5,012,973 A | | 5/1991 | Dick et al. |
| 5,079,538 A | * | 1/1992 | DeFino et al. .............. 340/426 |
| 5,083,962 A | * | 1/1992 | Pracas ........................ 446/184 |
| 5,083,965 A | | 1/1992 | Mayem ....................... 446/305 |
| 5,092,811 A | | 3/1992 | Bergenguer ................. 446/301 |
| 5,094,644 A | | 3/1992 | Kelley ........................ 446/305 |
| 5,096,424 A | * | 3/1992 | Carlberg ..................... 434/262 |
| 5,224,863 A | | 7/1993 | Lauer et al. ................ 434/261 |
| 5,281,180 A | | 1/1994 | Lam et al. ................... 446/175 |
| 5,290,198 A | | 3/1994 | Nakayama ................... 446/297 |
| 5,314,336 A | | 5/1994 | Diamond et al. ........... 446/169 |
| RE34,800 E | * | 11/1994 | Hutchins .................... 128/898 |
| 5,443,388 A | | 8/1995 | Jurmain et al. ............. 434/238 |
| 5,509,810 A | * | 4/1996 | Schertz et al. .............. 434/262 |
| 5,746,602 A | | 5/1998 | Kikinis |
| 5,752,880 A | | 5/1998 | Gabai et al. |
| 6,000,987 A | | 12/1999 | Belin et al. |
| 6,042,450 A | | 3/2000 | Leversedge et al. |
| 6,048,209 A | | 4/2000 | Bailey |
| 6,050,826 A | | 4/2000 | Christianson et al. |
| RE36,776 E | | 7/2000 | Jurmain et al. |

OTHER PUBLICATIONS

Baby Think It Over Program™ Student's Handbook (Generation 4), 1996.

Baby Think It Over Program™ Operating Instructions (Generation 4), 1996.

Important Safety and Use Information About Your New Baby Think It Over Infant Simulator, undated.

"Ready–or–Not Tot" brochure, Jun. 1997.

Nasco's Family & Consumer Sciences Home Page Information, 1997.

"Ready–or–Not Tot" Instruction Manual, 1997.

* cited by examiner

INFANT SIMULATOR

FIELD OF THE INVENTION

This invention broadly relates to the field of simulated child care. More specifically, the invention relates to infant simulators used in educational programs for educating prospective parents about the realities of parenthood, assisting in the education and training of personnel entering the child-care profession, and assisting in the continuing education of persons working in the child-care profession.

BACKGROUND

Teen-age pregnancy is an ever increasing problem. Teen-age parents, surveyed as to why they elected to have a baby, gave such reasons as "babies are so cute," "I wanted attention," and "I needed someone to love and love me back." Such romantic feelings toward having a baby almost never include an understanding of the responsibilities imposed by a baby, including loss of sleep, loss of freedom, the need for constant attention, etc. Attempts to educate teen-agers about the trials and tribulations of caring for an infant and raising a child, using the traditional educational methods of lecture and readings, are rarely successful.

Some resourceful educators, realizing that traditional educational methods are inadequate, have attempted to demonstrate the care requirements of an infant by requiring students to carry a sack of flour, an egg or a plant for several days. While somewhat exemplary of the care requirements of an infant, such programs do not fairly represent the care requirements of an actual infant and have proven to be of limited success.

U.S. Pat. No. 3,190,038 issued to Kardon, U.S. Pat. No. 3,490,170 issued to Wolf, U.S. Pat. No. 3,514,899 issued to Bonanno et al., U.S. Pat. No. 4,115,948 issued to Burks and U.S. Pat. No. 5,094,644 issued to Kelley describe dolls that will wet a diaper after being fed from a bottle. The dolls described in Kardon and Wolf each include electrical circuitry capable of initiating crying when a diaper on the doll is sufficiently wetted after being fed from a bottle, and terminating such crying upon removal of the wetted diaper. Similarly, the doll described in Bonanno et al. further includes electrical circuitry capable of initiating crying when the doll is diapered and a bottle is removed from the mouth of the doll, and terminating such crying by removing the diaper from the doll. Such dolls are not useful for educating students about the trials and tribulations of caring for an infant as the feeding and wetting cycle, with or without crying, is under control of the user. The student, unless under constant supervision by an educator, can feed and change the doll on a schedule selected by the student. In addition, the dolls do not acurately simulate the care requirements of an actual infant in that the student is not instructed by the doll to replace the wetted diaper with a dry diaper to terminate crying.

U.S. Pat. No. 4,249,338 issued to Wexler discloses a doll which emits a crying sound when a manually operated switch is actuated. The user must then determine which of several switches, labeled with such actions as feeding, diaper changing or back patting, will turn off the crying sound. While interesting as a plaything, this doll suffers from the same drawback as the "feed and wet" dolls in that activation of crying is under control of the user. The student, unless under constant supervision by an educator, can activate crying on a schedule selected by the student.

U.S. Pat. No. 4,451,911 issued to Klose et al. discloses a doll which can operate in two different modes. In a first mode, the doll emits different sounds based upon which of several switches, located at various positions on the body of the doll, is actuated (e.g., actuation of the mouth switch produced "yum-yum," while actuation of the back switch produces "aahh"). In a second mode the doll emits a sound and the user must then determine which of the switches will turn off the crying sound and produce a satisfaction signal, such as "mommy." The user can deactivate the doll by pressing a specified switch on the doll or simply failing to activate the proper switch within a given time period. Again, while interesting as a plaything, this doll suffers from the same drawback as the "feed and wet" dolls in that activation and deactivation of the doll is under control of the user. The student, unless under constant supervision by an educator, can activate and deactivate the doll on a schedule selected by the student.

A particularly useful infant simulator system for use in educating students about the care requirements of an infant is described in U.S. Pat. No. 5,443,388 issued to Jurmain et al. and assigned to the assignee of this application. The patent discloses an infant simulator capable of crying at intervals, with the crying continuing until a quieting key is inserted into the infant simulator and continuously held in position against a biasing means for a defined time period. The crying schedule may be changed to simulate either a healthy or a sick infant. A tremblor may be included to cause the infant to shake at intervals for purposes of simulating a drug-dependent infant. The infant simulator can also include indicators showing rough handling, improper positioning and the detection of a loud sound. The quieting key may include a means for securing the key to an assigned individual.

While the infant simulator described in U.S. Pat. No. 5,443,388 and sold under the trademark BABY THINK IT OVER® has proven extremely useful as an educational tool, a continuing need exists for an improved infant simulator capable of realistically demonstrating the variety of needs and care requirements of an infant, as well as the positive aspects of caring for and loving an infant.

SUMMARY OF THE INVENTION

The infant simulator includes a variety of features designed to emulate the care requirements of an infant. The infant simulator can be designed and programmed with any combination of the described features, including the ability the selectively activate and deactivate individual features for each assignment period. The infant simulator is equipped to record the quality of care and responsiveness of a person caring for the infant simulator and/or signal the person caring for the infant simulator when care is required.

The features can be conveniently grouped into the categories of (i) environmental condition sensors, (ii) episodic events, and (iii) ancillary features.

Environmental Conditions

Temperature Sensor

Infants should not be exposed to temperature extremes. The infant simulator can be equipped with a temperature sensor capable of sensing the environmental temperatures to which the infant simulator is exposed.

In a first embodiment, the infant simulator is further equipped with a system for recording the sensed temperature. In a second embodiment, the infant simulator is further equipped with a system for generating a perceptible thermal exposure signal when the sensed temperature falls above or below a defined acceptable temperature range. A preferred embodiment combines both the recording and signaling systems so that the person caring for the infant simulator is advised when the environmental temperature has reached an unacceptable level and the recorded information can be reviewed by a teacher or administrator upon completion of the assignment.

Compression Sensor

Infants must be handled with care at all times and should never be squeezed. One of the more prevalent abuses results when a frustrated care provider squeezes the infant, usually the infants arm, leg or head. The infant simulator can be equipped with a compression sensor capable of sensing compression of the infant simulator.

In a first embodiment, the infant simulator is further equipped with a system for recording the sensed compression. In a second embodiment, the infant simulator is further equipped with a system for generating a perceptible distress signal when compression is sensed. A preferred embodiment combines both the recording and signaling systems so that the person caring for the infant simulator is immediately notified that they have injured the infant simulator and the recorded information can be reviewed by a teacher or administrator upon completion of the assignment.

Episodic Events

Diaper Change

Infants require periodic diaper changes. A realistic simulation of a diaper change should include the actual changing of a diaper. By requiring the "soiled" diaper to be removed and a new diaper placed upon the infant simulator, the person caring for the infant simulator learns that you must carry an extra diaper at all times, and gains a more complete understanding of the requirements of an actual diaper change (e.g., a person carrying the infant simulator into a restaurant would, assuming some level of modesty and etiquette, take the infant simulator to the rest room to change the diaper).

The infant simulator can be equipped with (i) a system for generating a perceptible soiled-diaper signal, (ii) a system in communication with the soiled-diaper signal generating system for arresting the soiled-diaper signal in response to receipt of a diaper-changed signal, and (iii) a diaper configured and arranged to be fitted over the lower torso of the infant simulator as a diaper, with the diaper having a means effective for transmitting the diaper-changed signal to the soiled-diaper signal arresting system when the diaper is fitted on the infant simulator.

The infant simulator can further be equipped with a system for measuring and recording the duration of each diaper-change episode (i.e., the time period between initiation of the perceptible soiled-diaper signal and completion of a diaper change effective for transmitting the diaper-changed signal.)

Rocking

Infants often like to be gently rocked. Parents and other care providers will often rock an infant when the infant is fidgety or fussy, or when the person simply wants to comfort the infant. A realistic simulation of rocking should require actual rocking of the infant simulator.

The infant simulator can be equipped with (i) a system for generating a perceptible rocking-request signal, and (ii) a system in communication with the rocking-request signal generating system for detecting rocking of the infant simulator and arresting the rocking-request signal when rocking is detected.

The infant simulator can further be equipped with a system for measuring and recording the duration of each rocking-request episode (i.e., the time period between initiation of the perceptible rocking-request signal and the commencement of rocking.)

Feeding with Burp

Infants must be regularly fed. A realistic simulation of a feeding should require both feeding and burping of the infant simulator. In order to accurately emulate a feeding, the infant simulator can be equipped with both a feeding-request module and a burping-request module, with the burping-request module requiring actual patting of the infant simulator.

The feeding module can include (i) a system for generating a perceptible feeding-request signal, (ii) a system in communication with the feeding-request signal generating system for arresting the feeding-request signal in response to receipt of a feeding signal, (iii) a device for transmitting the feeding signal to the feeding-request signal arresting system when placed in communicative proximity to the infant simulator and thereby arresting the feeding-request signal.

The burping-request module can include (i) a system for generating a perceptible burping-request signal, (ii) a system for initiating generation of the burping-request signal in communication with both the feeding-request module and the burping-request signal generating system for initiating generation of the burping-request signal after the feeding signal is received by the feeding-request module, and (iii) a system in communication with the burping-request signal generating system for detecting patting of the doll and arresting the burping-request signal when patting is detected.

The infant simulator can further be equipped with a means for individually or separately measuring and recording the duration of each feeding-request episode and each burping-request episode (ie., the time period between initiation of the perceptible feeding-request signal and the commencement of feeding for a feeding-request episode, and the time period between initiation of the perceptible burping-request signal and the commencement of patting for a burping-request episode.)

Fussy and Demand Event

Infants will occasionally fuss for one reason or another and, despite every effort by the parent or other care-provider, cannot be comforted. In such situations, the infant tends to continue fussing until the unknown cause of the fussing dissipates of its own accord. In order to accurately emulate the frustration encountered by parents and other care-providers in such situations, the infant simulator can be equipped with a demand module (e.g., a diaper-change module, a rocking module, a feeding module, etc.) and a fussing module, wherein only the demand module is capable of being satisfied.

The demand module can include (i) a system for generating a perceptible demand signal, (ii) a system in communication with the demand signal generating system for arresting the demand signal in response to receipt of a satisfaction signal, and (iii) a device for transmitting the satisfaction signal to the demand signal arresting system when placed in communicative proximity to the infant simulator and thereby arresting the demand signal.

The fussing module can include (i) a system for generating a perceptible fussing signal, (ii) a fussing interval timer in communication with the fussing signal generating system for initiating generation of the fussing signal at intervals; and (iii) a fussing duration timer in communication with the fussing signal generating system for terminating generation of the fussing signal at the end of a fussing period.

Since the fussing module does not include a system capable of arresting the fussing signal, the fussing signal will necessarily continue until the end of the fussing period regardless of the actions of the parent or other care-provider.

Ancillary Features

The features described below are labeled as ancillary features because they function to enhance performance of an infant simulator exhibiting at least one type of a demand event. For practical purposes, the disclosed ancillary features are operable in combination with any of the demand modules disclosed herein (ie., diaper-change, rocking, feeding with burp, and fussing with demand event) as well as any other demand module requiring the parent or other care-provider to provide the infant simulator with a satisfaction signal.

As utilized herein, including the claims the phrase "demand module" references a module which includes at least (i) a means for generating a perceptible demand signal, and (ii) a means in communication with the demand signal generating means for arresting the demand signal in response to receipt of a satisfaction signal. As a general matter, a "demand module" signals a care-provider that some type of interaction is required between the care-provider and the infant, and arrests the signal when the required interaction is provided.

Contented Signal Feature

The responsibility of caring for an infant can engender the contrasting emotions of fulfillment and frustration. A realistic simulation of caring for an infant should include events emulating both the positive and negative aspects of caring for an infant.

The infant simulator can be equipped with a contented condition module which, in combination with a demand module, for providing positive feedback to the person caring for the infant simulator when proper care is provided. The contented module can include (i) a system for generating a perceptible contented signal, and (ii) a system in communication with the demand module and the perceptible contented signal generating system for initiating generation of the contented signal after a satisfaction signal has been received by the demand module.

Escalating Demand Signal Feature

Infants can provide a variety of perceptible signals to parents and other care-provides requesting that a need be satisfied. While the most common signal is crying, other signals include fidgeting, fussing, gasping, repeated side-to-side shaking of the head, rubbing of the eyes and face, and whining. In addition, infants will usually escalate the signal over time when the need remains unsatisfied. Hence, a realistic simulation of caring for an infant should provide for an escalation in the strength, intensity and/or severity of a demand signal as the demand remains unsatisfied over time.

An infant simulator having a demand module can be further equipped with a system in communication with the demand module for escalating the perceptible demand signal generated by the demand signal generating system as the duration of the demand episode increases.

Identification System Feature

In order for a student to fully appreciate the responsibility of caring for an infant, and for a teacher to provide meaningful feedback to the student, it is important that the student to whom the infant simulator is assigned tend to the demands of the infant simulator. In other words, it is important that the infant simulator be equipped with some type of system which requires the assigned student to tend to the needs of the infant simulator, or at least be present when the duties are discharged.

For purposes of ensuring that the assigned care-provider is at least present when the demands of the infant simulator are being satisfied as required by the demand module, the infant simulator can be equipped with an identification feature including at least, (i) a system for receiving an identification signal personal to the assigned care-provider, and (ii) a system in communication with the identification-signal receiving system and the demand module effective for preventing arresting of the demand signal until the identification signal is received by the identification-signal receiving system.

Multiple Behavior Modes Feature

Infants have different care requirements. Some infants will sleep for several hours at night, while others will wake almost every hour and require some type of attention. In order to emulate the different care requirements of different infants, the infant simulator can be equipped to permit a teacher or administrator to select between several programs which require different levels of care. These different levels of care can be produced by altering the time interval between events (i.e., increase or decrease the number of events occurring within an assignment period) and/or altering the duration of each event (i.e., increase or decrease the length of each period). The different levels of care can be set to represent the care requirements of an easy, an average and a difficult infant, thereby allowing the teacher or administrator to tailor the simulation to each specific student.

DETAILED DESCRIPTION OF THE INVENTION INCLUDING A BEST MODE

Definitions

Figure 1:
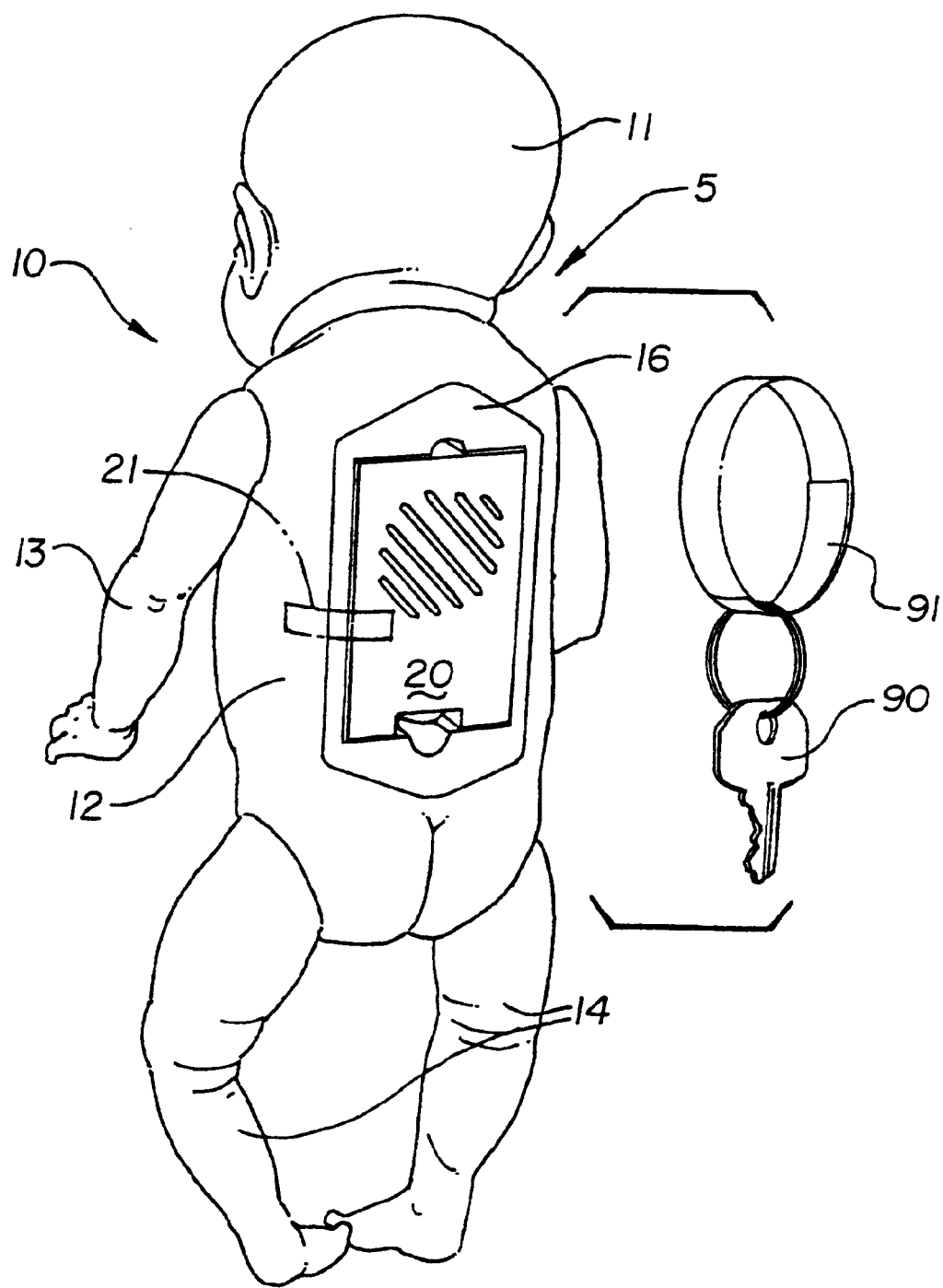
FIG. 1 is a perspective view of one embodiment of the infant simulator including one embodiment of an identification key and tamper indicating bracelet.

As utilized herein, including the claims, the term "activated," when used to describe the condition of an infant simulator, means that (i) at least one of the environmental sensors and associated means for recording the sensed environmental variable are sensing and recording (e.g., environmental temperature or compression), and/or (ii) at least one of the episodic demand events is capable of occurring at any time or the time interval to such occurrence is being timed (e.g., diaper-change, feeding, or fussy event).

As utilized herein, including the claims, the term "arrested," when used to describe the condition of a perceptible signal generating means, means that the perceptible signal is no longer expressed and includes both termination of the signal (i.e., the perceptible signal will not be generated until reinitiated by the occurrence of a defined condition or event) and inhibition of the signal (i.e., the perceptible signal will be expressed upon the removal or cessation of a specific condition or event).

As utilized herein, including the claims, the phrase "assignment period," means the period of time during which the infant simulator is activated and the assigned person or team is given custody of the infant simulator (e.g., overnight, 48 hours, one week, etc.).

As utilized herein, including the claims, the phrase "burping-request episode," refers to the event of burping the infant simulator in reaction to a demand signal from the doll indicating a desire to be burped. Each burping-request episode, from the perspective of a care provider, begins when a perceptible burping-request signal is initiated and ends when patting of the infant simulator is commenced. It is noted for purposes of clarity that this definition is not intended to mandate the specific signal received by the burping-request episode duration measuring means for initiating the timing of a burping-request episode (e.g., timing of a burping-request episode can be initiated by a signal emanating from the burping-request interval timer or a signal generated by the perceptible burping-request signal generating means), nor specify the particular sequence by which an electrical signal must travel through the burping-request module (e.g., the burping-request module may be configured and arranged so that the burping-request episode duration measuring means receives a signal to start timing a burping-request episode before, after or simultaneously with the receipt of a corresponding signal by the perceptible burping-request signal generating means).

As utilized herein, including the claims, the phrase "elevated compression," means compression of a magnitude such that discomfort or injury would normally be inflicted upon an actual infant. Compression having a magnitude insufficient to be classified as an "elevated compression" include specifically, but not exclusively, a compression resulting from such routine activities as bathing, patting to elicit a burp, ordinary handling, hugging, lying on a carpeted floor, rubbing of the stomach, light tickling, etc.

As utilized herein, including the claims, the phrase "compression episode," means the time period beginning when compression is sensed and ending when compression is no longer sensed.

As utilized herein, including the claims, the term "continuous," when used in connection with the demand event of feeding the doll, means that the feeding signal transmitting means (e.g., a bottle) is held in communicative position relative to the doll by a care provider so as to transmit the feeding signal to the feeding-request system (e.g., the bottle is inserted into the mouth of the doll) without release of the feeding signal transmitting means by the care provider for any appreciable time period (ie., from a fraction of a second up to as long as about five seconds).

As utilized herein, including the claims, the term "continuous," when used in connection with the demand event of rocking the doll, means that the doll is subjected to appropriate levels of accelerative motion without stop or separated only by stationary periods of modest duration (ie., from a fraction of a second up to as long as about five seconds).

As utilized herein, including the claims, the term "continuous," when used in connection with the recording of temperature values, means that the temperature is recorded on a predetermine schedule (e.g., every nanosecond, every second, every ten seconds, every two minutes, etc.) without interruption.

As utilized herein, including the claims, the phrase "demand episode," refers to an event requiring a specified interaction between the doll and a care-provider in response to a signal from the doll that such an interaction is desired. Each demand episode, from the perspective of a care provider, begins when a perceptible demand signal is initiated by the doll and ends when an appropriate satisfaction signal or action is transmitted to the doll in response to the demand signal. Exemplary, demand episodes include specifically, but not exclusively, diaper-change episodes, feeding-request episodes, burping-request episodes and rocking-request episodes.

As utilized herein, including the claims the phrase "demand module" references a module which includes at least (i) a means for generating a perceptible demand signal, and (ii) a means in communication with the demand signal generating means for arresting the demand signal in response to receipt of a satisfaction signal. As a general matter, a "demand module" signals a care-provider that some type of interaction is required between the care-provider and the infant, and arrests the signal when the required interaction is provided.

As utilized herein, including the claims, the phrase "demand period," means the period of time during which the demand signal will be generated and expressed by the doll unless a satisfaction signal or action is being received by the doll. Exemplary, demand periods include specifically, but not exclusively, diaper-change periods, feeding-periods, burping periods and rocking periods.

As utilized herein, including the claims, the phrase "diaper-change episode," refers to the event of changing the doll's diaper in response to a signal from the doll that the diaper is soiled. Each diaper-change episode, from the perspective of a care provider, begins when a perceptible soiled-diaper signal is initiated and ends when a changed-diaper signal is transmitted. It is noted for purposes of clarity that this definition is not intended to mandate the specific signal received by the diaper-change module for initiating or terminating the timing of a diaper-change episode (e.g., timing of a diaper-change episode can be initiated by a signal emanating from the diaper-change interval timer or a signal generated by the perceptible soiled-diaper signal generating means), nor specify the particular sequence by which an electrical signal must travel through the diaper-change module (e.g., the diaper-change module may be configured and arranged so that the diaper-change duration timer receives a signal to start timing a diaper-change episode before, after or simultaneously with the receipt of a corresponding signal by the perceptible soiled-diaper signal generating means).

As utilized herein, including the claims, the phrase "distress period," when used in connection with the generation of a distress signal, means a time period of predetermined duration or bounded random duration beginning immediately or shortly after sensing of a compression. When the end of a distress period is measured from commencement of a compression episode, the distress period should be selected so as to have a longer duration than any anticipated compression episode (e.g., a minimum distress period of 15 seconds when typical compression episodes measured at 5 to 10 seconds) in order to avoid an anomalous situation in which the distress period (i.e., the distress signal) ends before the compression episode (i.e., exertion of the compressive force upon the infant simulator) ends. Alternatively, when the end of a distress period is measured from termination of a compression episode, the distress period may have any desired duration since the distress period, by definition, cannot end before the compression episode ends.

As utilized herein, including the claims, the term "doll" means a figure representative of a human being and including at least a portion representing a head and a portion representing a torso. The figure is preferably shaped as an infant and includes arms and legs. Other physical features can be represented as desired, including specifically, but not exclusively, hair, eyes, eye lashes, eyebrows, ears, nose, mouth, hands, fingers, fingernails, areolae, bellybutton, genitalia, feet, toes, toenails, skin pigmentation, and physical deformities.

As utilized herein, including the claims, the phrase "feeding period," means the period of time during which the feeding-request signal will be generated and expressed unless the appropriate satisfaction signal (i.e., a feeding signal) is being continuously provided.

As utilized herein, including the claims, the phrase "feeding-request episode," refers to the event of feeding the doll in reaction to a demand signal from the doll indicating a desire to be fed. Each feeding-request episode, from the perspective of a care provider, begins when a perceptible feeding-request signal is initiated and ends when feeding is commenced. It is noted for purposes of clarity that this definition is not intended to mandate the specific signal received by the feeding-request module for initiating or arresting the timing of a feeding-request episode (e.g., timing of a feeding-request episode can be initiated by a signal emanating from the feeding-request interval timer or a signal generated by the perceptible feeding-request signal generating means), nor specify the particular sequence by which an electrical signal must travel through the feeding-request module (e.g., the feeding-request module may be configured and arranged so that the feeding-request duration timer receives a signal to start timing a feeding-request episode before, after or simultaneously with the receipt of a corresponding signal by the perceptible feeding-request signal generating means).

As utilized herein, including the claims, the term "infant" refers to a young human being ranging in age from a newborn, including a premature newborn, to an approximately one year old child.

As utilized herein, including the claims, the term "key" refers to any device configured and arranged to fit within and communicate with a complementary keyhole, including specifically, but not exclusively a passkey of specified configuration, a card having holes in a specified pattern, a card bearing information on a magnetic strip, a magnet of specified strength and configuration, etc.

As utilized herein, including the claims, the phrase "predetermined value" means a specific value (e.g., 10 minutes) and includes both permanently assigned values (e.g., a duration period which is always 10 minutes) and values assigned for an assignment period and capable of being reassigned for subsequent assignment periods (e.g., a time interval predetermined at the start of an assignment period as 2, 5 or 7 minutes).

As utilized herein, including the claims, the phrase "random variable" is used in accordance with the dictionary definition of random variable (i.e., a variable that is a function of the result of a statistical experiment in which each outcome has a definite probability of occurrence, such as the number of spots showing if two dice are thrown). The phrase "bounded random variable" means that the random variable must fall within defined minimum and maximum values (i.e., the variable must greater than 0 and less than 13.)

As utilized herein, including the claims, the term "restricted" means limited access, with access generally achievable only upon the exercise of intentional and deliberate actions directed toward the objective of achieving such access (e.g., removing a machine screw, cutting a closure band, entering an access code, removing a tamper indicating label, etc.).

As utilized herein, including the claims, the phrase "rocking period," means the period of time during which the rocking-request signal will be generated and expressed unless the doll is continuously rocked.

As utilized herein, including the claims, the phrase "rocking-request episode," refers to the event of rocking the doll in reaction to a demand signal from the doll indicating a desire to be rocked. Each rocking-request episode, from the perspective of a care provider, begins when a perceptible rocking-request signal is initiated and ends when rocking is commenced. It is noted for purposes of clarity that this definition is not intended to mandate the specific signal received by the rocking-request module for initiating or arresting the timing of a rocking-request episode (e.g., timing of a rocking-request episode can be initiated by a signal emanating from the rocking-request interval timer or a signal generated by the perceptible rocking-request signal generating means), nor specify the particular sequence by which an electrical signal must travel through the rocking-request module (e.g., the rocking-request module may be configured and arranged so that the rocking-request duration timer receives a signal to start timing a rocking-request episode before, after or simultaneously with the receipt of a corresponding signal by the perceptible rocking-request signal generating means).

As utilized herein, including the claims, the phrases "adjusting the potential duration of a period," and "adjusting the potential duration of a time interval" means changing the probability of occurrence such that a longer or shorter duration is more likely to occur. Such adjustment can occur by (i) changing one or both of the endpoints of the time range from which the duration of the period or interval can be selected (e.g., a change from a 10 to 20 minute time range to a 10 to 50 minute time range or a change from a 10 to 20 minute time range to a 40 to 50 minute time range), and/or (ii) changing the statistical preference for a time value within a defined time range (e.g., a change from a 10 to 20 minute time range with a 40% chance of selecting a duration of 15 to 20 minutes to a 10 to 20 minute time range with an 80% chance of selecting a duration of 15 to 20 minutes).

As utilized herein, including the claims, the phrase "perceptible signal" means any and all means of communication capable of conveying notice or warning to a care provider, including specifically, but not exclusively audible signals (e.g., crying), olfactory signals (e.g., emission of odorous gas), tactile signals (e.g., wet diaper), visual signals (e.g., gesture), and multimedia signals (e.g., crying and tears).

As utilized herein, including the claims, the phrase "substantially identical signals," refers to signals perceived by the same sense (e.g., audible signals) and of the same general type (e.g., crying sound, shaking body, floral smell, etc.) with some aspect of the signals perceptibly different (e.g., different pitch, different rate, different intervals between repetitions, different volumes, etc.).

As utilized herein, including the claims, the phrase "thermal exposure episode," means the time period beginning when a sensed temperature falls outside a defined acceptable temperature range and ending when a subsequently sensed temperature falls within the defined acceptable temperature range.

| Nomenclature | |
| --- | --- |
| 05 | Infant Simulator |
| 10 | Doll |

-continued

Nomenclature

| | |
|---|---|
| 11 | Head |
| 12 | Torso |
| 13 | Arms |
| 14 | Legs |
| 16 | Back of Doll |
| 20 | Central Microcontroller Unit |
| 21 | Tamper Indicating Label |
| 30 | Position Sensor |
| 40 | Temperature Sensor |
| 50 | Compression Sensing System |
| 51 | Electrical Circuit |
| 51a | First Contact |
| 51b | Second Contact |
| 60 | Diaper |
| 60a | First Diaper |
| 60b | Second Diaper |
| 61 | Magnet Attached to Diaper |
| 62 | Diaper-Change Switches |
| 62a | First Diaper-Change Switch |
| 62b | Second Diaper-Change Switch |
| 70 | Motion Sensor (Rocking, Burping and Abuse) |
| 80 | Bottle |
| 80n | Nipple of Bottle |
| 81 | Magnet Attached to Bottle |
| 82 | Feed Switch |
| 90 | Identification Key |
| 91 | Tamper Indication Bracelet |
| 100 | Initiation Module |
| 110 | Position Sensing Module |
| 120 | Temperature Sensing Module |
| 130 | Compression Sensing Module |
| 140 | Diaper-Change Module |
| 150 | Rocking Module |
| 160 | Feeding Module |
| 170 | Burping Module |
| 180 | Fussy Module |
| 190 | Assignment Period Module |
| 210 | Demand Signal Generating Feature |
| 220 | Recording Feature |
| 230 | Contented Signal Feature |
| 240 | Escalating Demand Signal Feature |
| 250 | Identification System Feature |
| 260 | Multiple Time Interval Duration Feature |
| 270 | Multiple Period Duration Feature |
| $S_1$ | Repositioning-Request Signal Generated by the Infant Simulator |
| $S_2$ | Thermal Exposure Signal Generated by the Infant Simulator |
| $S_3$ | Distress Signal Generated by the Infant Simulator |
| $S_4$ | Soiled-Diaper Signal Generated by the Infant Simulator |
| $St_4$ | Diaper-Change Satisfaction Signal Provided by Care Provider |
| $St_4^+$ | First Diaper-Change Satisfaction Signal |
| $St_4^-$ | Second Diaper-Change Satisfaction Signal |
| $S_5$ | Rocking-Request Signal Generated by the Infant Simulator |
| $St_5$ | Rocking-Request Satisfaction Signal Provided by Care Provider |
| $S_6$ | Feeding-Request Signal Generated by the Infant Simulator |
| $St_6$ | Feeding-Request Satisfaction Signal Provided by Care Provider |
| $S_7$ | Burping-Request Signal Generated by the Infant Simulator |
| $St_7$ | Burping-Request Satisfaction Signal Provided by Care Provider |
| $S_8$ | Fussy Signal Generated by the Infant Simulator |
| + | Positive ("Contented") Signal Generated by Infant Simulator |
| $S^{ID}$ | Identification Signal |
| $Sw^{ID}$ | Identification Switch |
| ↪ | Bypass |

Construction

As shown in FIG. 1, the infant simulator 05 comprises a doll 10 having a recess (unnumbered) within the back 16 of the doll 10 capable of retaining a central microcontroller unit 20 and a battery pack 25 for powering the central microcontroller unit 20.

A lock-and-key system (not shown) or tamper indicating device, such as a tamper indicating label 21, can be provided for purposes of signaling and/or recording efforts to remove or otherwise access the central microcontroller unit 20 and/or battery pack 25 from the doll 10.

The doll 10 preferably has the appearance of a young infant (e.g., approximately 40 to 80 cm in length and approximately 3 to 5 kg in weight) with a head 11, torso 12, arms 13, and legs 14. The doll 10 can be sculpted to depict the skin color and facial feature of various ethnic groups including specifically, but not exclusively, African American, Asian, Caucasian, Hispanic, and Native American.

The infant simulator 05 can include a variety of modules designed to emulate the care requirements of an infant. These modules include (i) a position sensing module 110, (ii) a temperature sensing module 120, (iii) a compression sensing module 130, (iv) a diaper-change module 140, (v) a rocking module 150, (vi) a feeding module 160 with or without an associated burping module 170, and (vii) a fussy module 180. The infant simulator 05 can be designed and programmed with any combination of the described modules, including the ability to selectively activate and deactivate individual modules for each assignment period.

The infant simulator 05 is equipped to record the quality of care and responsiveness of a person caring for the infant simulator 05 and/or signal the person caring for the infant simulator 05 when care is required.

The modules can be conveniently grouped into the categories of (i) environmental condition sensors, and (ii) episodic events. In addition, the specifics of each episodic event can be adjusted by the use of one or more ancillary features which can be programmed into the central microcontroller unit 20.

Environmental Conditions

The environmental consitions of abuse, position, temperature and/or compression can be sensed and reported.

Abuse Sensing System

The infant simulator 05 can be equipped with a motion sensor 70 capable of detecting physical abuse of the doll 10 such as by shaking, striking or throwing of the infant simulator 05. Such an abuse sensing system is described in U.S. Pat. No. 5,443,388 issued to Jurmain et al.

A number of different types and styles of motion sensors 70 may be effectively used to sense and report abuse. One such sensor, capable of providing variable output dependent upon the force of the motion to which the infant simulator 05 is subjected, is a magnetic field induced shock sensor manufactured by Directed Electronics, Inc. under Part No. 504IC wherein movement of a magnet, resulting from a corresponding movement of the doll 10, generates an electrical current in an induction coil, with the strength of the electrical current proportional to the speed and distance traveled by the magnet. The motion sensor 70 is electrically connected to the central microcontroller unit 20 wherein the strength of the electrical current generated by the motion sensor 70 can be checked against predefined threshold limitations for producing different signals dependent upon the strength of the electrical current. This permits the single motion sensor 70 to differentiate between a modest force, such as produced by normal handling, rocking and burping of the infant simulator 05, and excessive force, such as experienced when the infant simulator 05 is thrown, shaken or otherwise abused. When motion of the appropriate amplitude is sensed, an electrical abuse signal is sent to the central microcontroller unit 20 and an abuse event reported.

The same motion sensor 70 can be effectively used to sense rocking and patting as well as abuse.

Position Sensing System 30

The infant simulator 05 can be equipped with a position sensor 30, such as a mercury switch or roller ball switch, capable of sensing the vertical and horizontal positioning of the infant simulator 05 and communicating the sensed position as between an acceptable position (switch open) and an unacceptable position (switch closed) to the central microcontroller unit 20. Acceptable positioning includes laying on its back or left side, while unacceptable positioning includes laying face down or upside down. Suitable positioning sensors are available from a number of manufacturers. One suitable position sensing switch is an SPST SMT normally open switch manufactured by ITT Canon under Part No. KSC421JD.

In order to avoid the sensing of routine handling as an unacceptable positioning of the infant simulator 05, the central microcontroller unit 20 is preferably programmed with a threshold time value, such as 3 to 10 seconds, which must be exceeded before a sensed unacceptable positioning is reported and/or recorded as an unacceptable positioning of the infant simulator 05.

In a first embodiment, a recording function within the central microcontroller unit 20 records occurrences of unacceptable positioning for later review by the teacher or program administrator. The specific information recorded and reported by the central microcontroller unit 20 can range from the relatively simple to the complex. For example, the central microcontroller unit 20 can be programmed to simply record and report that the infant simulator 05 was unacceptably positioned at least once during the assignment period. Alternatively, the central microcontroller unit 20 can record the number of times the infant simulator 05 was unacceptably positioned and the duration of each occurrence. A nonexhaustive list of options for recording and reporting positioning data is set forth in Table One, provided below.

TABLE ONE (OPTIONS FOR RECORDING AND REPORTING UNACCEPTABLE POSITIONING DATA)

| OPTION | DESCRIPTION | DATA RECORDED | SAMPLE READOUT |
|---|---|---|---|
| 1 | Records and reports only fact that the infant simulator was unacceptably positioned at least once during the assignment period. | YES/NO | Light ON/OFF |
| 2 | Records and reports the number of times the infant simulator was unacceptably positioned. | Number | "5" |
| 1 | Records and reports total amount of time the infant simulator was unacceptably positioned during an assignment period. | Minutes | 45 |
| 3 | Records and reports the number of times the infant simulator was unacceptably positioned and the total amount of time the infant simulator was unacceptably positioned. | #/Minutes | 5: 45 |
| 3 | Records and reports the number of times the infant simulator was unacceptably positioned, the total amount of time the infant simulator was unacceptably positioned, and the mean duration of each occurrence. | #/Minutes Minutes | 5: 45 03 |
| 3 | Records and reports the amount of time the infant simulator remained in an unacceptable position for each occurrence during an assignment period. | #/Minutes | 1: 03 2: 18 3: 20 4: 02 5: 02 |
| 4 | Records and reports the number of times the infant simulator was unacceptably positioned, the total amount of time the infant simulator | #/Minutes Minutes | 5: 45 03:18:20:02:02 |

TABLE ONE-continued (OPTIONS FOR RECORDING AND REPORTING UNACCEPTABLE POSITIONING DATA)

| OPTION | DESCRIPTION | DATA RECORDED | SAMPLE READOUT |
|---|---|---|---|
| | was unacceptably positioned, and the amount of time the infant simulator remained in an unacceptable position for each occurrence during an assignment period. | | |

In a second embodiment, the central microcontroller unit 20 is connected to a system (not shown) capable of generating a repositioning-request signal $S_1$, such as an audible cry or scream. The central microcontroller unit 20 is programmed to generate the repositioning-request signal $S_1$ whenever the infant simulator 05 is placed in an unacceptable position (e.g., laying face down or upside down) and left in that position beyond a minimum threshold time period (e.g., ten seconds). Generation of the repositioning-request signal $S_1$ warns the person caring for the infant simulator 05 that the infant simulator 05 is in an improper position and corrective action is required. The repositioning-request signal $S_1$ and timing of the positioning-request episode can be terminated by simply repositioning the infant simulator 05 into an acceptable position, thereby opening the position sensor 30 and terminating transmission of an electrical signal from the position sensor 30 to the central microcontroller unit 20.

The central microcontroller unit 20 can be programmed to generate the repositioning-request signal $S_1$ only at the beginning of each occurrence of improper positioning (i.e., generate a three second signal once the infant simulator 05 is sensed in an unacceptable position for longer than the minimum threshold time period), periodically throughout an improper positioning occurrence, or continuously throughout an improper positioning occurrence.

A preferred embodiment of the position sensing system 30 combines both the recording and signaling systems.

The repositioning-request signal $S_1$ may be intensified, in accordance with the ancillary feature of providing an escalated demand signal 240, based upon an increase in the length of time the infant simulator 05 is unacceptably positioned. An example of each is set forth in Table Two, provided below.

TABLE TWO (ESCALATING REPOSITIONING-REQUEST SIGNAL)

| STRENGTH OF PERCEPTIBLE SIGNAL (AUDIBLE) | LENGTH OF TIME INFANT SIMULATOR REMAINS IN AN UNACCEPTABLE POSITION (MINUTES) |
|---|---|
| $1^{st}$ Intensity (soft cry) | <10 |
| $2^{nd}$ Intensity (loud cry) | >10 |

Temperature Sensing System 40

The infant simulator 05 can be equipped with a temperature sensor 40, such as a simple thermocouple, capable of sensing the environmental temperatures to which the infant simulator 05 is exposed and communicating the sensed temperatures to the central microcontroller unit 20.

In a first embodiment, a recording function within the central microcontroller unit 20 records the sensed temperatures for later review by the teacher or program administrator. The specific information recorded and reported by the central microcontroller unit 20 can range from the relatively simple to the complex. For example, the central microcontroller unit 20 can be programmed to simply record and report whether the sensed environmental temperature fell outside a defined acceptable temperature range (e.g., 10° C. and 40° C., preferably 15° C. and 35° C.) at least once during the assignment period. Alternatively, the central microcontroller unit 20 can record temperature values every two minutes throughout an entire assignment period and graphically report the recorded temperatures at the end of the assignment period. A nonexhaustive list of options for recording and reporting thermal exposure data is set forth in Table Three, provided below.

TABLE THREE (OPTIONS FOR RECORDING AND REPORTING THERMAL EXPOSURE DATA)

| OP-TION | DESCRIPTION | DATA RECORDED | SAMPLE READOUT |
|---|---|---|---|
| 1 | Records only fact that sensed temperature fell outside of acceptable temperature range at least once (i.e. thermal exposure episode occurred). | YES/NO | Light ON/OFF |
| 2 | Records number of thermal exposure episodes. | Number | "3" |
| 3 | Records high and low temperature extremes. | ° C. | 22° C.: 49° C. |
| 4 | Records high and low temperature extremes experienced during all thermal exposure episodes. | ° C. | *° C.: 49° C. |
| 5 | Records the number and temperature extreme for each thermal exposure episode. | ° C. | 1: 42° C. 2: 44° C. 3: 53° C. 4: 8° C. |
| 6 | Records the number and duration of each thermal exposure episode. | #/Minutes | 1: 06 2: 18 3: 02 4: 02 5: 02 |
| 7 | Records the number of thermal exposure episodes and continuously records the temperature throughout a thermal exposure episode. | #/° C. | 1:07, 07, 06, 07, 08, 06, 04, 03, 05, 07. 2: 41, 43, 45, 46, 47, 47, 47, 47, 45, 42, 41. |
| 8 | Continuously records the temperature throughout an assignment period. | Minutes/° C. | 02: 27 04: 27 06: 28 08: 29 10: 28 |

In a second embodiment, the central microcontroller unit 20 is programmed with defined upper and lower temperature limits (e.g., 10° C. and 40° C., preferably 15° C. and 35° C.) and connected to a system (not shown) capable of generating a perceptible thermal exposure signal $S_2$. The central microcontroller unit 20 is programmed to generate the perceptible thermal exposure signal $S_2$. when the sensed temperature falls outside the acceptable temperature range. Generation of the perceptible thermal exposure signal $S_2$ warns the person caring for the infant simulator 05 that the environmental temperature has reached an unacceptable level and corrective action is required. The thermal exposure signal $S_2$ and timing of the thermal exposure episode can be terminated by removing the infant simulator 05 from the unacceptably warm or cold environment (e.g., removing the infant simulator 05 from the car), thereby returning the body temperature of the infant simulator 05 to an acceptable temperature and ceasing transmission of an electrical signal from the temperature sensor 40 to the central microcontroller unit 20.

A preferred embodiment of the temperature sensor module combines both the recording and signaling systems.

The central microcontroller unit 20 can be programmed to generate the perceptible thermal exposure signal $S_2$ only at the beginning of a thermal exposure episode (i.e., generate a ten second signal as soon as a sensed temperature falls outside the acceptable temperature range), periodically throughout a thermal exposure episode (e.g., generate a two second signal every minute once the sensed temperature falls outside the acceptable temperature range until the sensed temperature returns to the acceptable temperature range), or continuously throughout a thermal exposure episode.

The thermal exposure signal $S_2$ may be intensified, in accordance with the ancillary feature of providing an escalated demand signal 240, based upon (i) an increase in the difference between the sensed temperature and the temperature limit, and/or (ii) an increase in the duration of the thermal exposure episode. An example of each is set forth in Table Four, provided below.

TABLE FOUR (ESCALATING THERMAL-DISCOMFORT SIGNAL)

| STRENGTH OF PERCIPTIBLE SIGNAL (AUDIBLE) | THERMAL EXPOSURE DURATION (MINUTES) | TEMPERATURE BEYOND ACCEPTABLE LIMIT (° C.) |
|---|---|---|
| 1st Intensity (whimper) | <5 | <5 |
| 2nd Intensity (scream) | 5 to 10 | 5 to 10 |
| 3rd Intensity (shriek) | >10 | >10 |

The temperature sensor 40, as with the central microcontroller unit 20 and battery pack 25, is preferably equipped with a tamper indicating device (not shown) for purposes of signaling and/or recording efforts to remove or otherwise access the temperature sensor 40.

Compression Sensing System 50

The infant simulator 05 can be equipped with a compression sensing system 50 capable of sensing compression of the doll 10, such as squeezing of the doll's head 11, arms 13 and/or legs 14, and communicating any sensed compression to the central microcontroller unit 20.

Figure 3:
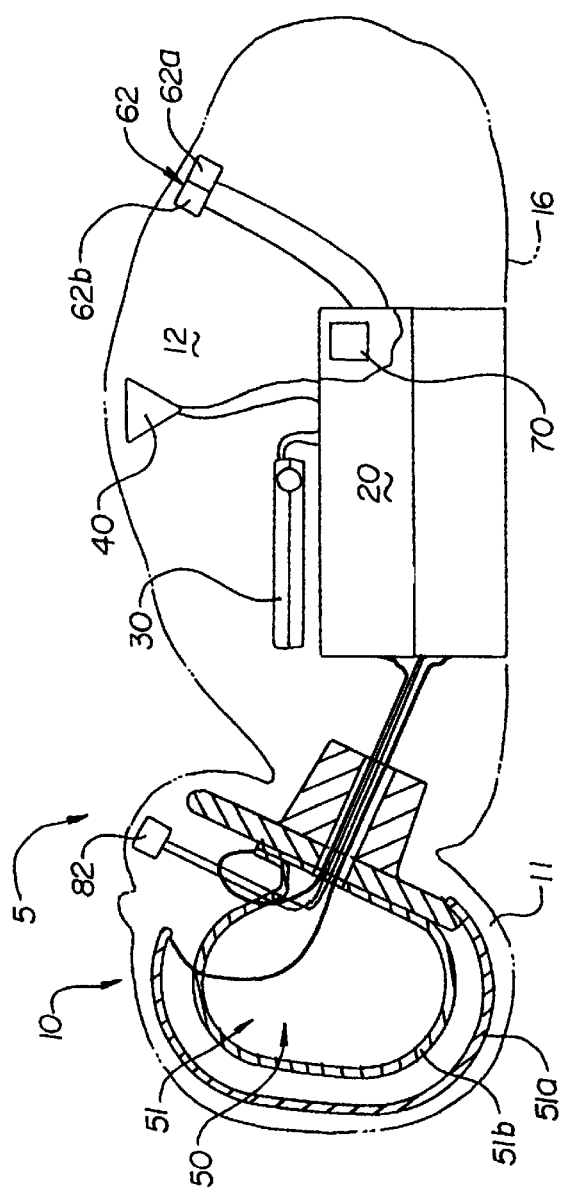
FIG. 3 is a cross-sectional side view of the infant simulator shown in FIG. 1, showing one embodiment of the internal electrical components of the infant simulator.

Referring to FIG. 3, a compression sensing system 50 is provided in the head 11 of the doll 10 for sensing squeezing or striking of the head 11. The head 11 is constructed of a pliant material, such as a soft vinyl material, with a normally open electrical circuit 51 provided within the head 11. The first contact 51a of the electrical circuit 51 is a thin layer of conductive material laminated to the inside surface (unnumbered) of the head 11 such that the conductive material moves in concert with the head 11 when the head 11 is deformed. The second contact 51b of the electrical circuit 51 is a cage of conductive material inwardly spaced from the first contact 51a of the electrical circuit 51. The spacing between the first 51a and second 51b contacts of the normally open electrical circuit 51 is selected so that the contacts 51a and 51b will engage one another and close the electrical circuit 51 when the head 11 is subjected to a compressive force or an impact force reflective of abusive squeezing or striking of the head 11. Spacing between the first 51a and second 51b contacts should be selected so that the compression sensing system 50 will consistently sense compressive and impact forces reflective of abuse without sensing compressive and impact forces reflective of normal handling. The spacing necessary to achieve these desired sensing parameter is dependent upon a number of factors, including the type of material used to construct the head 11, the thickness of the material forming the head 11, the size and shape of the head 11, the flexibility of the material laminated to the inside surface of the head 11 to form the first contact 51$a$, etc. By way of illustration, when the head 11 is molded from approximately ¼ inch thick plasticized polyvinyl chloride, and the first contact 51$a$ is a 3 to 4 mil thick aluminum foil, a spacing of approximately ½ to 1 inch should generally provide the desired sensing parameters (i.e., consistently sensing compressive and impact forces reflective of abuse without sensing compressive and impact forces reflective of normal handling).

Optionally, a flexible second cage (not shown) comprising a third contact (not shown) could be positioned intermediate the first 51$a$ and second 51$b$ contacts to form a secondary electrical circuit (not shown) with the first contact 51$a$ in electrical communication with the central microcontroller unit 20. The third contact (not shown) would be constructed of a material sufficiently flexible to permit the first 51$a$ and third (not shown) contacts to engage the second contact 51$b$ when the head 11 experienced an abusive level of compressive or impact force. When such a secondary electrical circuit (not shown) is employed, the compression sensing system 50 is capable of sensing different levels of compressive or impact force (e.g., the secondary circuit is closed when a "mild" or "low" compressive or impact force is experienced while the primary circuit 51 is closed when an "abusive" or "high" compressive or impact force is experienced).

In a first embodiment, a recording function within the central microcontroller unit 20 records sensed compression episodes for later review by the teacher or program administrator. The specific information recorded and reported by the central microcontroller unit 20 can range from the relatively simple to the complex. For example, the central microcontroller unit 20 can be programmed to simply record and report the occurrence of at least one sensed compression episode during the assignment period. Alternatively, the central microcontroller unit 20 can record and report the number of sensed compression episodes occurring during an assignment period and the duration of each sensed compression episode. A nonexhaustive list of options for recording and reporting compression episode data is set forth in Table Five, provided below.

TABLE FIVE (OPTIONS FOR RECORDING AND REPORTING COMPRESSION EPISODE DATA)

| OPTION | DESCRIPTION | DATA RECORDED | SAMPLE READOUT |
|---|---|---|---|
| 1 | Records occurrence of first compression episode only | YES/NO | Light ON/OFF |
| 2 | Records number of separate compression episodes. | Number | "3" |
| 3 | Records maximum level of compressive force sensed during an assignment period. | Force Level (Low/High) | High |
| 5 | Records the number of compression episodes sensed during an assignment period and the maximum level of compressive force sensed for each compression episode. | # Force Level (Low/High) | 1: Low 2: Low 3: High 4: Low |
| 6 | Records the number and duration of each compression episode sensed | # / Seconds | 1: 01 2: 01 |

TABLE FIVE-continued (OPTIONS FOR RECORDING AND REPORTING COMPRESSION EPISODE DATA)

| OPTION | DESCRIPTION | DATA RECORDED | SAMPLE READOUT |
|---|---|---|---|
|  | during an assignment period. |  | 3: 08 4: 02 |

In a second embodiment, the central microcontroller unit 20 is connected to a system (not shown) capable of generating a perceptible distress signal $S_3$, such as an audible cry or scream. The central microcontroller unit 20 is programmed to generate the perceptible distress signal $S_3$ when compression is sensed. Generation of the perceptible distress signal $S_3$ warns the person caring for the infant simulator 05 that the infant simulator 05 has been subjected to injurious compression or impact. The distress signal $S_3$ can be terminated, optionally after an appropriate delay, and timing of the compression episode ended, by removing the external event responsible for the compression or impact (e.g., removing the hand of a young sibling squeezing the head 11 of the infant simulator 05), thereby reopening the compression sensing electrical circuit 51 and terminating transmission of an electrical signal from the electrical circuit 51 to the central microcontroller unit 20.

The central microcontroller unit 20 can be programmed to generate the perceptible distress signal $S_3$ only at the beginning of a compression episode (i.e., generate a three second signal as soon as a compression episode is sensed), continuously throughout a compression episode, or continuously throughout a compression episode and for an additional time period after compression of the infant simulator 05 has ceased for purposes of simulating injury to the infant simulator 05.

A preferred embodiment of the compression sensing system 50 combines both the recording and signaling systems.

The distress signal $S_3$ may be intensified, in accordance with the ancillary feature of providing an escalating demand signal 240, based upon (i) an increase in the maximum sensed compressive force, and/or (ii) an increase in the duration of the compression episode. An example of each is set forth in Table Six, provided below.

TABLE SIX (ESCALATING DISTRESS SIGNAL)

| STRENGTH PERCEPTIBLE (AUDIBLE) | COMPRESSION EPISODE DURATION (SECONDS) | COMPRESSIVE FORCE |
|---|---|---|
| 1st Intensity (cry) | <5 | Low |
| 2nd Intensity (scream) | >5 | High |

Episodic Events
Diaper-Change Event

The central microcontroller unit 20 can be programmed to effect periodic diaper-change episodes, wherein the student caring for the infant simulator 05 is signaled by the infant simulator 05, on a schedule unknown to the student, that the diaper 60 on the infant simulator 05 needs to be changed. Preferred soiled-diaper signals $S_4$ include an audible cry and/or a wetting of the diaper 60.

The time interval between diaper-change periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of events, it is generally preferred to control the time interval between events as a bounded random variable. Alternatively, multiple predefined programs, each providing a different fixed schedule of events, can also be realistically employed so long as the students do not know which program has been selected (ie., the schedule of events is random from the perspective of the student) and the number of programs is sufficient to prevent the students from memorizing one or two different schedules and thereafter being able to partially defeat the purpose of the program by ignoring the infant simulator 05 between scheduled events.

Referring to FIG. 3, the infant simulator 05 can include a pair of oppositely mounted, normally open Hall Effect switches 62a and 62b (hereinafter diaper-change switches), within the torso 12 of the doll 10. A wide variety of suitable Hall Effect switches 62 are available from a number of different manufacturers, including Hall Effect switch Model No. DN 6851 manufactured by Panasonic. The diaper-change switches 62 are electrically connected to the central microcontroller unit 20. Because the diaper-change switches 62 are mounted in reverse directions within the doll 10, the first diaper-change switch 62a is closed only by a magnet 61 having a "north" facing polarity, while the second diaper-change switch 62b is closed only by a magnet 61 having a "south" facing polarity.

Figure 4A:
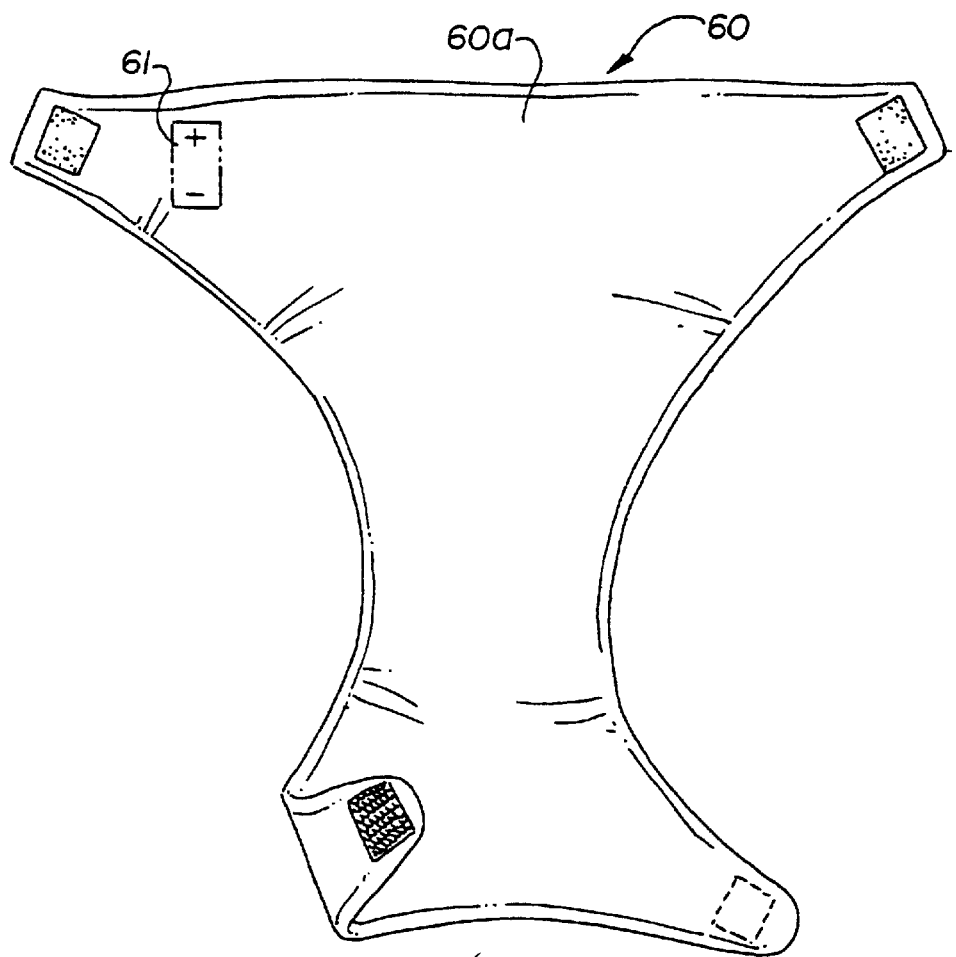
FIG. 4a is a perspective view of one embodiment of a first diaper for use in combination with the infant simulator for transmitting a diaper-change satisfaction signal.
Figure 4B:
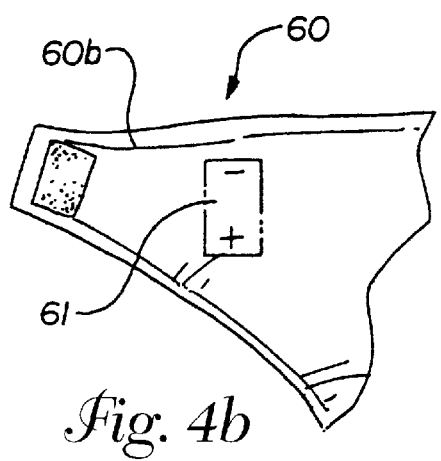
FIG. 4b is a perspective view of a portion of one embodiment of a second diaper for use in combination with the infant simulator for transmitting a diaper-change satisfaction signal.

Referring to FIGS. 4a and 4b, the student caring for the infant simulator 05 is provided with two diapers 60 sized to fit the infant simulator 05. A magnet 61 is sewn into each of the diapers 60 at a position effective for placing the magnet 61 in close proximity to the appropriate diaper-change switch 62 when the diaper 60 is fitted onto the doll 10. The magnet 61 in the first diaper 60a is rotated so that the magnet 61 has a "north" facing polarity when the first diaper 60a is fitted onto the doll 10, while the magnet 61 in the second diaper 60b is rotated so that the magnet 61 has a "south" facing polarity when the second diaper 60b is fitted onto the doll 10. When the appropriate diaper-change switch 62 is closed, an electrical satisfaction signal is sent to the central microcontroller unit 20 and the soiled-diaper signal $S_4$ is arrested. Timing of the diaper-change episode is also terminated.

The central microcontroller unit 20 initiates a diaper-change episode by alternating the "selected" diaper-change switch 62 as between the first 62a and second 62b diaper-change switches, and initiating generation of a perceptible soiled-diaper signal $S_4$. In order to arrest the soiled-diaper signal $S_4$, the student must close the newly selected diaper-change switch 62 by changing the diaper 60.

The central microcontroller unit 20 preferably includes a recording function for recording relevant diaper-change episode data for later review by the teacher or program administrator. The specific information recorded by the central microcontroller unit 20 can range from the relatively simple to the complex. For example, the central microcontroller unit 20 can be programmed to simply record and report the total duration of all diaper-change episodes. Alternatively, the central microcontroller unit 20 can record and report the total number of diaper-change episodes which occurred during an assignment period and the duration of each individual diaper-change episode. A nonexhaustive list of options for recording and reporting relevant diaper-change episode data is set forth in Table Seven, provided below.

TABLE SEVEN (OPTIONS FOR RECORDING AND REPORTING DIAPER-CHANGE EPISODE DATA)

| OPTION | DESCRIPTION | DATA RECORDED | SAMPLE READOUT |
|---|---|---|---|
| 1 | Records and reports total duration of all diaper-change episodes occuring throughout an assignment period. | Minutes | 45 |
| 2 | Records and reports number of diaper-change episodes and total duration of all diaper-change episodes occurring throughout an assignment period. | #/Minutes | 5: 45 |
| 3 | Records and reports number of diaper-change episodes, total duration of all diaper-change episodes occurring throughout an assignment period, and mean duration of the diaper-change epsiodes. | #/Minutes Minutes | 5: 45 03 |
| 3 | Records and reports duration of each diaper-change episode occurring throughout an assignment period. | #/Minutes | 1: 03 2: 18 3: 20 4: 02 5: 02 |
| 4 | Records and reports number of diaper-change episodes total duration of all diaper-change episodes occurring throughout an assignment period, and duration of each diaper-change episode occurring throughout an assignment period. | #/Minutes Minutes | 5: 45 03:18:20:02:02 |

The central microcontroller unit 20 can be programmed to generate the perceptible soiled-diaper signal $S_4$ only at the beginning of a diaper-change period (ie., generate a ten second signal when a diaper-change period is initiated by the central microcontroller unit 20), periodically throughout a diaper-change period (e.g., generate a two second signal every minute once a diaper-change period is initiated by the central microcontroller unit 20), or continuously throughout a diaper-change period.

The soiled-diaper signal $S_4$ may be intensified, in accordance with the ancillary feature of providing an escalating demand signal 240, based upon an increase in the duration of the diaper-change episode. An example is set forth in Table Eight, provided below.

TABLE EIGHT (ESCALATING SOILED DIAPER SIGNAL)

| STRENGTH OF PERCEPTIBLE SIGNAL (AUDIBLE) | DIAPER-CHANGE EPISODE DURATION (MINUTES) |
|---|---|
| 1st Intensity (soft cry) | <10 |
| 2nd Intensity (loud cry) | >10 |

Rocking Event

The central microcontroller unit 20 can be programmed to effect periodic rocking-request episodes, wherein the student caring for the infant simulator 05 is signaled by the infant simulator 05, on a schedule unknown to the student, to provide the infant simulator 05 with attentive care in the form of rocking. Preferred types of rocking-request signals $S_5$ include crying, whimpering, fidgeting and combinations thereof.

The time interval between rocking periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of events, it is generally preferred to control the time interval between events as a bounded random variable. Alternatively, multiple predefined programs, each providing a different fixed schedule of events, can also be realistically employed so long as the students do not know which program has been selected (ie., the schedule of events is random from the perspective of the student) and the number of programs is sufficient to prevent the students from memorizing one or two different schedules and thereafter being able to partially defeat the purpose of the program by ignoring the infant simulator 05 between scheduled events.

Referring to FIG. 3, the infant simulator 05 can include a motion sensor 70 within the torso 12 of the doll 10 effective for sensing rocking of the infant simulator 05. A number of different types and styles of motion sensors 70 may be effectively used. One such sensor, capable of providing variable output dependent upon the force of the motion to which the infant simulator 05 is subjected, is a magnetic field induced shock sensor manufactured by Directed Electronics, Inc. under Part No. 504IC wherein movement of a magnet, resulting from a corresponding movement of the doll 10, generates an electrical current in an induction coil, with the strength of the electrical current proportional to the speed and distance traveled by the magnet. The motion sensor 70 is electrically connected to the central microcontroller unit 20 wherein the strength of the electrical current generated by the motion sensor 70 can be checked against predefined threshold limitations for producing different signals dependent upon the strength of the electrical current. This permits the single motion sensor 70 to differentiate between a modest force, such as produced by normal handling, rocking and burping of the infant simulator 05, and excessive force, such as experienced when the infant simulator 05 is thrown, shaken or otherwise abused. When motion of the appropriate amplitude is sensed, an electrical satisfaction signal is sent to the central microcontroller unit 20 and the rocking-request signal $S_5$ is arrested. Timing of the rocking-request episode is also terminated.

The central microcontroller unit 20 initiates a rocking-request episode by initiating generation of a perceptible rocking-request signal $S_5$. In order to arrest the rocking-request signal $S_5$, the student must rock the infant simulator 05 with sufficient force to generate an appropriate electrical current in the motion sensor 70 (i.e., sufficient to signal "rocking" but insufficient to signal "abuse").

The central microcontroller unit 20 can be programmed to either terminate or inhibit generation of the rocking-request signal $S_5$ once rocking is sensed. When the termination option is selected, the student need only rock the infant simulator 05 for some minimum time period (e.g., two to ten seconds) sufficient to ensure that rocking has been sensed, after which the student may stop rocking the infant simulator 05 and the rocking-request signal $S_5$ will not begin again. When the inhibition option is selected, the student must continuously rock the infant simulator 05 throughout the rocking period (e.g., five to twenty minutes) to prevent the rocking-request signal $S_5$ from being generated. The inhibition option is generally preferred as it more closely emulates the care requirements of an actual infant.

The central microcontroller unit 20 preferably includes a recording function for recording relevant rocking-request episode data for later review by the teacher or program administrator. The specific information recorded by the central microcontroller unit 20 can range from the relatively simple to the complex. For example, the central microcontroller unit 20 can be programmed to simply record and report the total duration of all rocking-request episodes. Alternatively, the central microcontroller unit 20 can record and report the total number of rocking-request episodes which occurred during an assignment period and the duration of each individual rocking-request episode. A nonexhaustive list of options for recording and reporting relevant rocking-request episode data is set forth in Table Nine, provided below.

TABLE NINE (OPTIONS FOR RECORDING AND REPORTING ROCKING-REQUEST EPISODE DATA)

| OPTION | DESCRIPTION | DATA RECORDED | SAMPLE READOUT |
|---|---|---|---|
| 1 | Records and reports total duration of all rocking-request episodes occurring throughout an assignment period. | Minutes | 45 |
| 2 | Records and reports number of rocking-request episodes and total duration of all rocking-request episodes occurring throughout an assignment period. | #/Minutes | 5:45 |
| 3 | Records and reports number of rocking-request episodes, total duration of all rocking-request episodes, and mean duration of the rocking-request episodes occurring throughout an assignment period. | #/Minutes Minutes | 5:45 03 |
| 3 | Records and reports duration of each rocking-requested episode occurring throughout an assignment period. | #/Minutes | 1:03 2:18 3:20 4:02 5:02 |
| 4 | Records and reports number of rocking-request episodes, total duration of all rocking-request episodes, and duration of each rocking-request episode occurring throughout an assignment period. | #/Minutes Minutes | 5:45 03:18:20: 02:02 |

The central microcontroller unit 20 can be programmed to generate the perceptible rocking-request signal $S_5$ only at the beginning of a rocking period (i.e., generate a ten second signal when a rocking period is initiated by the central microcontroller unit 20), periodically throughout a rocking period (e.g., generate a two second signal every minute once a rocking period is initiated by the central microcontroller unit 20), or continuously throughout a rocking period.

The rocking-request signal $S_5$ may be intensified, in accordance with the ancillary feature of providing an escalating demand signal 240, based upon an increase in the duration of the rocking-request episode. An example is set forth in Table Ten, provided below.

TABLE TEN (ESCALATING ROCKING-REQUEST SIGNAL)

| STRENGTH OF PERCEPTIBLE SIGNAL (AUDIBLE) | ROCKING-REQUEST EPISODE DURATION (MINUTES) |
|---|---|
| $1^{st}$ Intensity (soft cry) | <10 |
| $2^{nd}$ Intensity (loud cry) | >10 |

Feeding Event

The central microcontroller unit 20 can be programmed to effect periodic feeding-request episodes, wherein the student caring for the infant simulator 05 is signaled by the infant simulator 05, on a schedule unknown to the student, to feed the infant simulator 05. Preferred types of feeding-request signals $S_6$ include crying, sucking, outstretched arms 13 and combinations thereof.

The time interval between feeding periods can be a bounded random variable (e.g., occurring every 30 to 120 minutes) or a predetermined variable (e.g., sequentially occurring at intervals of 30, 90, 30, 30, 120, 60, 20 and 90 minutes). In order to more accurately emulate the care requirements of an actual infant, and prevent students from memorizing the schedule of events, it is generally preferred to control the time interval between events as a bounded random variable. Alternatively, multiple predefined programs, each providing a different fixed schedule of events, can also be realistically employed so long as the students do not know which program has been selected (i.e., the schedule of events is random from the perspective of the student) and the number of programs is sufficient to prevent the students from memorizing one or two different schedules and thereafter being able to partially defeat the purpose of the program by ignoring the infant simulator 05 between scheduled events.

Referring to FIG. 3, the infant simulator 05 can include a normally open Hall Effect switch 82 (hereinafter feed switch), within the head 11 of the doll 10 immediately behind the mouth (unnumbered). The feed switch 82 is electrically connected to the central microcontroller unit 20. The feed switch 82 is normally open, and can be closed only by a magnet 81 having the appropriately directed polarity.

Figure 5:
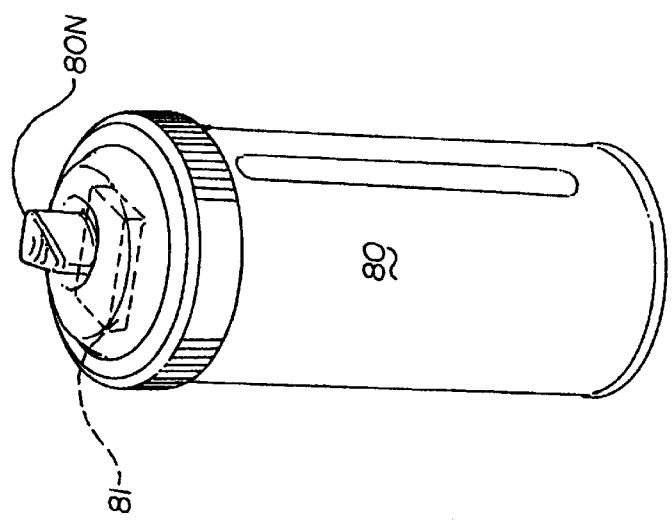
FIG. 5 is a perspective view of one embodiment of a bottle for use in combination with the infant simulator for transmitting a feeding-request satisfaction signal.

Referring to FIG. 5, the student caring for the infant simulator 05 is provided with a bottle 80 scaled to the size of the infant simulator 05. A magnet 81 is molded into the bottle 80 at a position effective for placing the magnet 81 in close proximity to the feed switch 82 when the bottle 80 is placed against the mouth (unnumbered) of the doll 10. Alternatively, the magnet 81 can be molded within a key (not shown) bearing indicia representative of a bottle.

The mouth (unnumbered) of the doll 10 can optionally be molded to include a shaped indentation (not shown) into which a correspondingly shaped nipple 80*n* on the bottle 80 can be inserted. The shape of the indentation (not shown) and the nipple 80*n* are selected so that the bottle 80 must be rotated into a predetermined relationship relative to the head 11 of the doll 10 in order to fit within the indentation (not shown). Such rotation-specific shapes include specifically, but not exclusively, an isosceles triangle, a circular segment, and an "L." When the nipple 80*n* of the bottle 80 is fitted within the indentation (not shown) in the mouth (unnumbered) the magnet 81 in the bottle 80 is properly oriented relative to the feed switch 82 and the feed switch 82 is closed. When the feed switch 82 is closed, an electrical satisfaction signal is sent to the central microcontroller unit 20 and the feeding-request signal $S_6$ arrested. Timing of the feeding-request episode is also terminated.

The central microcontroller unit 20 initiates a feeding-request episode by initiating generation of a perceptible feeding-request signal. In order to arrest the feeding-request signal, the student must "feed" the infant simulator 05 by placing the bottle 80 against the mouth (unnumbered) of the doll 10.

The central microcontroller unit 20 can be programmed to either terminate or inhibit generation of the feeding-request signal $S_6$ once the feeding signal is sensed. When the termination option is selected, the student need only feed the infant simulator 05 for some minimum time period (e.g., two to ten seconds) sufficient to ensure that feeding has been sensed, after which the student may stop feeding the infant simulator 05 and the feeding-request signal will not begin again. When the inhibition option is selected, the student must continuously feed the infant simulator 05 throughout the feeding-request period (e.g., five to twenty minutes) to prevent the feeding-request signal from being generated. The inhibition option is generally preferred as it more closely emulates the care requirements of an actual infant.

The central microcontroller unit 20 preferably includes a recording function for recording relevant feeding-request episode data for later review by the teacher or program administrator. The specific information recorded by the central microcontroller unit 20 can range from the relatively simple to the complex. For example, the central microcontroller unit 20 can be programmed to simply record and report the total duration of all feeding-request episodes. Alternatively, the central microcontroller unit 20 can record and report the total number of feeding-request episodes which occurred during an assignment period and the duration of each individual feeding-request episode. A nonexhaustive list of options for recording and reporting relevant feeding-request episode data is set forth in Table Eleven, provided below.

TABLE ELEVEN (OPTIONS FOR RECORDING AND REPORTING FEEDING-REQUEST EPISODE DATA)

| OPTION | DESCRIPTION | DATA RECORDED | SAMPLE READOUT |
|---|---|---|---|
| 1 | Records and reports total duration of all feeding-request episodes occurring throughout an assignment period. | Minutes | 45 |
| 2 | Records and reports number of feeding-request episodes and total duration of all feeding-request episodes occurring throughout an assignment period. | #/Minutes | 5:45 |
| 3 | Records and reports number of feeding-request episodes, total duration of all feeding-request episodes, and mean duration of the feeding-request episodes occurring throughout an assignment period. | #/Minutes Minutes | 5:45 03 |
| 3 | Records and reports duration of each feeding-request episode occurring throughout an assignment period. | #/Minutes | 1:03 2:18 3:20 4:02 5:02 |
| 4 | Records and reports number of feeding-request episodes, total duration of all feeding-request episodes, and duration of each feeding-request episode occurring throughout an assignment period. | #/Minutes Minutes | 5:45 03:18:20: 02:02 |

The central microcontroller unit 20 can be programmed to generate the perceptible feeding-request signal $S_6$ only at the beginning of a feeding period (i.e., generate a ten second signal when a feeding period is initiated by the central microcontroller unit 20), periodically throughout a feeding period (e.g., generate a two second signal every minute once a feeding period is initiated by the central microcontroller unit 20), or continuously throughout a feeding period.

The feeding-request signal $S_6$ may be intensified, in accordance with the ancillary feature of providing an escalating demand signal 240, based upon an increase in the duration of the feeding-request episode. An example is set forth in Table Twelve, provided below.

TABLE TWELVE (ESCALATING FEEDING-REQUEST SIGNAL)

| STRENGTH OF PERCEPTIBLE SIGNAL (AUDIBLE) | FEEDING-REQUEST EPISODE DURATION (MINUTES) |
|---|---|
| 1st Intensity (soft cry) | <10 |
| 2nd Intensity (loud cry) | >10 |

Burping Event

The central microcontroller unit 20 can be programmed to effect burping-request episodes, wherein the student caring for the infant simulator 05 is signaled by the infant simulator 05, on a schedule unknown to the student, to burp the infant simulator 05 after the infant simulator 05 has been feed in response to a feeding-request signal $S_6$. Burping-request periods can be initiated after the satisfaction of some or all of the feeding periods and is preferably initiated independently of any environmentally sensed conditions (e.g., initiation of a burping period is not contingent upon the student laying the infant simulator 05 face down on the floor after a feeding period). Preferred types of burping-request signals $S_7$ include crying, whimpering, fidgeting and combinations thereof Burping-request periods can be initiated immediately after the end of a satisfied feeding period or after a defined delay (e.g., two to thirty minutes). The delay between the end of a feeding period and initiation of a burping period can be a bounded random variable (e.g., 0 to 30 minutes) or a predetermined variable (e.g., sequentially occurring at intervals of 0, 9, 3, 0, 12, 6, 20 and 9 minutes). In order to more accurately emulate the care requirements of an actual infant, and prevent students from memorizing and sharing the schedule of events, it is generally preferred to control the length of the delay as a bounded random variable. Alternatively, multiple predefined programs, each providing a different fixed schedule of events including scheduling of burping periods, can also be realistically employed so long as the students do not know which program has been selected (i.e., the schedule of events is random from the perspective of the student) and the number of different delay durations is sufficient to prevent the students from memorizing one or two different delay durations and thereafter being able to partially defeat the purpose of the program by ignoring the infant simulator 05 between sequential feeding and burping events.

Referring to FIG. 3, the same motion sensor 70 used for purposes of sensing rocking of the infant simulator 05 can also be effectively used to sense burping of the infant simulator 05 since the type of motion provided by rocking and patting are both detectable by the motion sensor 70. When motion of the appropriate amplitude is sensed, an electrical satisfaction signal is sent to the central microcontroller unit 20 and the burping-request signal $S_7$ is arrested. Timing of the burping-request episode is also terminated.

The central microcontroller unit 20 initiates a burping-request episode by initiating generation of a perceptible burping-request signal $S_7$. In order to arrest the burping-request signal $S_7$, the student must burp or pat the infant simulator 05 with sufficient force to generate an appropriate electrical current in the motion sensor 70 (i.e., sufficient to signal "patting" but insufficient to signal "abuse").

The central microcontroller unit 20 can be programmed to either terminate or inhibit generation of the burping-request signal $S_7$ once patting is sensed. When the termination option is selected, the student need only burp the infant simulator 05 for some minimum time period (e.g., two to ten seconds) sufficient to ensure that burping has been sensed, after which the student may stop burping the infant simulator 05 and the burping-request signal $S_7$ will not begin again. When the inhibition option is selected, the student must continuously burp the infant simulator 05 throughout the burping period (e.g., two to sixty minutes, preferably five to twenty minutes) to prevent the burping-request signal $S_7$ from being generated. The inhibition option is generally preferred as it more closely emulates the care requirements of an actual infant.

The micro controller unit 20 can optionally be programmed to generate a "burp" sound at the end of a burping period, provided the requested burping action has been provided during the burping period (e.g., threshold duration of patting provided during burping period), for purposes of providing the student with positive feedback.

The central microcontroller unit 20 preferably includes a recording function for recording relevant burping-request episode data for later review by the teacher or program administrator. The specific information recorded by the central microcontroller unit 20 can range from the relatively simple to the complex. For example, the central microcontroller unit 20 can be programmed to simply record and report the total duration of all burping-request episodes. Alternatively, the central microcontroller unit 20 can record and report the total number of burping-request episodes which occurred during an assignment period and the duration of each individual burping-request episode. A nonexhaustive list of options for recording and reporting relevant burping-request episode data is set forth in Table Thirteen, provided below.

TABLE THIRTEEN (OPTIONS FOR RECORDING AND REPORTING BURPING-REQUEST EPISODE DATA)

| OPTION | DESCRIPTION | DATA RECORDED | SAMPLE READOUT |
|---|---|---|---|
| 1 | Records and reports total duration of all burping-request episodes occurring throughout an assignment period. | Minutes | 45 |
| 2 | Records and reports number of burping-request episodes and total duration of all burping-request episodes occurring throughout an assignment period. | #/Minutes | 5:45 |
| 3 | Records and reports number of burping-request episodes, total duration of all burping-request episodes, and mean duration of the burping-request episodes occurring throughout an assignment period. | #/Minutes Minutes | 5:45 03 |
| 3 | Records and reports duration of each burping-request episode occurring throughout an assignment period. | #/Minutes | 1:03 2:18 3:20 4:02 5:02 |
| 4 | Records and reports number of burping-request episodes, total duration of all burping-request episodes, and duration of each burping-request episode occurring throughout an assignment period. | #/Minutes Minutes | 5:45 03:18:20: 02:02 |

The central microcontroller unit 20 can be programmed to generate the perceptible burping-request signal $S_7$ only at the beginning of a burping period (i.e., generate a ten second signal when a burping period is initiated by the central microcontroller unit 20), periodically throughout a burping period (e.g., generate a two second signal every minute once a burping period is initiated by the central microcontroller unit 20), or continuously throughout a burping period.

The burping-request signal $S_7$ may be intensified, in accordance with the ancillary feature of providing an escalating demand signal 240, based upon an increase in the duration of the burping-request episode. An example is set forth in Table Fourteen, provided below.

TABLE FOURTEEN (ESCALATING BURPING-REQUEST SIGNAL)

| STRENGTH OF PERCEPTIBLE SIGNAL (AUDIBLE) | BURPING-REQUEST EPISODE DURATION (MINUTES) |
|---|---|
| 1st Intensity (soft cry) | <10 |
| 2nd Intensity (loud cry) | >10 |

Fussy Event

For purposes of emulating the actions of an actual infant, the central microcontroller unit 20 can be programmed to effect periodic fussy periods, wherein the student caring for the infant simulator 05 is signaled by the infant simulator 05, on a schedule unknown to the student, to tend to the infant simulator 05, without an ability to arrest the perceptible signal being generated by the infant simulator 05. Of course, the implementation of a fussy episode is only meaningful when used in combination with at least one other demand event (ie., environmental condition and/or episodic event) for which the perceptible signal can be arrested by taking the appropriate action. Fussy events can be interspersed throughout the assignment period as desired for purposes of emulating those times occasionally encountered in real life, when the infant is crying and nothing seems to satisfy the infant.

The central microcontroller unit 20 can be programmed to generate the perceptible fussy signal $S_8$ only at the beginning of a fussy period (i.e., generate a ten second signal when a fussy period is initiated by the central microcontroller unit 20), periodically throughout a fussy period (e.g., generate a two second signal every minute once a fussy period is initiated by the central microcontroller unit 20), or continuously throughout a fussy period. Preferred types of fussy signals $S_8$ include crying, whimpering, whining, coughing, fidgeting and combinations thereof The student should be expected to make some effort to satisfy the fussing infant simulator 05. Handling of the infant simulator 05 can be detected by the same motion sensor 70 used for purposes of sensing rocking and burping of the infant simulator 05. In the event that no effort is made to satisfy the fussing infant simulator 05, the fussy signal $S_8$ may be intensified, in accordance with the ancillary feature of providing an escalating demand signal 240, based upon a threshold time duration during which the fussy signal $S_8$ has been generated without any detectable handling. An example is set forth in Table Fifteen, provided below.

The perceptible fussy signal $S_8$—normal or intensified—is not arrested once handling is detected. The receipt of an electrical "handling" signal by the central microcontroller unit 20 is effective only for preventing escalation of the perceptible fussy signal $S_8$. Hence, once the perceptible fussing signal has been intensified, subsequent handling of the infant simulator 05 does not reduce or arrest the perceptible fussy signal $S_8$.

TABLE FIFTEEN (ESCALATING FUSSY SIGNAL)

| STRENGTH OF PERCEPTIBLE SIGNAL (AUDIBLE) | FUSSY DURATION WITHOUT HANDLING (MINUTES) |
|---|---|
| 1st Intensity (soft cry) | <10 |
| 2nd Intensity (loud cry) | >10 |

Ancillary Features
Perceptibly Different Signals

The infant simulator 05 provides a perceptible signal for each of a number of different events, selected from (i) the environmental conditions of position, temperature and compression, and (ii) the episodic events of diaper-change, rocking, feeding, burping, and fussing. The perceptible signal generated for each of these conditions/events can be the same or different. For example, the perceptible signal generated when the infant simulator 05 is unacceptable positioned can be a loud cry, while the perceptible signal generated for requesting to be fed and to be rocked can be a whimper. The differences can be significant (e.g., whimpering verses screaming), or subtle (e.g., loud whimpering verses soft crying).

The use of different perceptible signals for different conditions/events serves the desired effect of awarding attentive student by informing such students of the specific satisfaction signal required (e.g., a soft cry signal a need to be rocked while whimpering signals a need to change the diaper 60). In order to prevent the students from memorizing and sharing such information, the infant simulator 05 can optionally be equipped with an ability for the teacher or other program administrator to change the specific perceptible signal to be generated for each condition/ event at the beginning of each assignment period.

Contented Signal

The microcontroller unit 20 may be programmed to provide a positive response + when the student has appropriately responded to a demand event, (e.g., timely changing a diaper 60 in response to a soiled-diaper signal $S_4$). The positive response + can be substantially any perceptible signal recognizable as signaling a happy or contented infant, including specifically, but not exclusively audible signals (e.g., cooing or giggling), olfactory signals (e.g., emission of pleasant scent), visual signals (e.g., smiling, or wiggling of the feet), and multimedia signals (e.g., cooing and smiling).

The positive response + can be scheduled to occur immediately upon satisfaction of the requested activity (e.g., after changing a soiled diaper 60 or at the end of a satisfied burping period) or after a defined time delay (e.g., two minutes after changing a soiled diaper 60 or between 20 seconds and two minutes after a satisfied burping period has ended).

The microcontroller unit 20 may be programmed to provide the positive response + upon the satisfaction of each and every demand event, only upon the satisfaction of selected demand events, or as a bounded random variable (e.g., only after every other satisfied demand event, only after satisfied burping and diaper-change events, or a 20% chance of occurring after each satisfied demand event). A positive response + should not be provided in connection with an environmentally triggered event (i.e., thermal exposure signal $S_2$ or distress signal $S_3$) since satisfaction of such signals is based upon removal of an unpleasant stimuli rather than the comforting satisfaction of a need.

Escalating Demand Signal 240

The microcontroller unit 20 may be programmed to escalate the strength, intensity and/or severity of the perceptible demand signals generated by the infant simulator 05 as the severity of an environmental condition increases (e.g., the temperature of the infant simulator 05 is more than 5° C. greater than a maximum allowable temperature) and/or duration of a demand episode increases (e.g., the demand episode lasts longer than 10 minutes). The escalation can be effected in a variety of ways dependent upon the specific type of signal. For example, an audible cry can be escalated from a soft cry to a loud cry, or from a cry to a scream. Similarly, a light can be changed from a white light to a red light.

The perceptible demand signal can be escalated through any number of continuous or stepped levels as desired. A simple single stepped escalation—normal to increased—is relatively simple to implement and generally effective for providing the student with appropriate notice that a demand is not being timely satisfied.

Identification System

In order to ensure that the student assigned to care for the infant simulator 05 is at least present when the demands of the infant simulator 05 are being satisfied (i.e., either providing the necessary care themselves or securing the necessary care from someone else at the time the demand event occurs), the infant simulator 05 can be equipped with an identification system (not shown). The identification system (not shown) would prevent a satisfaction signal (e.g., rocking of the infant simulator 05) from arresting the demand signal (e.g., rocking-request signal $S_5$) until an identification signal $S^{ID}$ is received by the identification system (not shown).

An exemplary identification system (not shown) includes at least, (i) a means for receiving an identification signal $S^{ID}$ personal to the assigned care-provider, and (ii) a means in communication with the identification-signal receiving means (not shown) and the central microcontroller unit 20 effective for preventing arresting of a demand signal until the identification signal $S^{ID}$ is received by the identification-signal receiving means (not shown).

The means for receiving an identification signal $S^{ID}$ personal to the assigned care-provider can be any of a number of systems or devices capable of identifying and responding only to a unique item or characteristic possessed by the assigned care-provider. A nonexhaustive list of such devices includes (i) a fingerprint recognition device (not shown), (ii) a voice recognition device (not shown), and (iii) a keyhole (not shown) accepting a uniquely shaped identification key 90 attachable to the wrist of the assigned care provider by a tamper indicating bracelet 91.

Multiple Behavior Modes

The central microcontroller unit 20 may be programmed to allow a teacher or other program administrator to change the level of care required by the infant simulator 05. Alternatively, selection of the level can be randomly selected by the central microcontroller unit 20 for each assignment period. These different levels of care can be produced by altering the time interval between events (i.e., increase or decrease the number of events occurring within an assignment period) and/or altering the duration of each event (i.e., increase or decrease the length of each period). The levels of care can be increased and/or decreased through any number of continuous or stepped levels as desired. A convenient program permits the care level to be selected from amongst an easy level (ie., long intervals and short events), an average level (ie., modestly long intervals and alternating long and short events), and a difficult level (e.g., short intervals and long events).

EXAMPLE

FIGS. 2a–j provide a flowchart for one embodiment of each of the modules listed below in Table Sixteen. Each of the modules includes both the demand signal generating feature 210 and the recording feature 220, except for the fussy module 180 which includes only a demand signal generating feature 210, and the initiation 100 and assignment period 190 modules which do not include either of these features.

The modules also include each of the ancillary features of contented signal 230, escalating demand signal 240, and identification system 250 as listed next to each module. The ancillary features of multiple time interval durations 260 and multiple period durations 270, used to create multiple behavior modes, are not shown or depicted in the flowchart as such features are controlled by the central microcontroller unit 20 rather than the individual modules.

TABLE SIXTEEN (LISTING OF MODULES AND ANCILLARY FEATURES)

| MODULE | REFERENCE NO. | ANCILLARY FEATURES |
|---|---|---|
| INITIATION | 100 | None |
| POSITION | 110 | 1. Escalating Demand Signal |
| TEMPERATURE | 120 | 1. Escalating Demand Signal |
| COMPRESSION | 130 | 1. Escalating Demand Signal |
| DIAPER CHANGE | 140 | 1. Contented Signal |
|  |  | 2. Identification System |
|  |  | 3. Escalating Demand Signal |
| ROCKING | 150 | 1. Contented Signal |
|  |  | 2. Identification System |
|  |  | 3. Escalating Demand Signal |
| FEEDING | 160 | 1. Contented Signal |
|  |  | 2. Identification System |
|  |  | 3. Escalating Demand Signal |
| BURP | 170 | 1. Contented Signal |
|  |  | 2. Identification System |
|  |  | 3. Escalating Demand Signal |
| FUSSY | 180 | None |
| ASSIGNMENT PERIOD | 190 | None |

The individual modules can occur in any sequence, with the exception of the initiation module 100 which must occur first, the assignment period module 190 which must occur last, and the burping module 170 which can occur only after satisfaction of the feeding module 160.

Initiation Module 100

Upon activating the infant simulator 05, the central microcontroller unit 20 turns the bypass signal → ON, begins timing the assignment period, and begins timing the intervals between successive, diaper-change, rocking, feeding, and fussy periods based upon the program selected and/or preprogrammed into the central microcontroller unit 20. Based upon the program selected, the central microcontroller unit 20 signals each of the diaper-change 140, rocking 150, feeding 160 and fussy 180 modules at the appropriate times to start and stop a corresponding demand period, as represented by © in the flow chart. The central microcontroller unit 20 also commences cycling through each of the modules.

Position Module 110

The position sensor 30 detects the position of the infant simulator 05 as between an acceptable position (eg., laying on its back or left side) and an unacceptable position (e.g., laying face down or upside down) and signals the position module 110 when the infant simulator 05 is detected in an unacceptable position.

Figures 2, 2A:
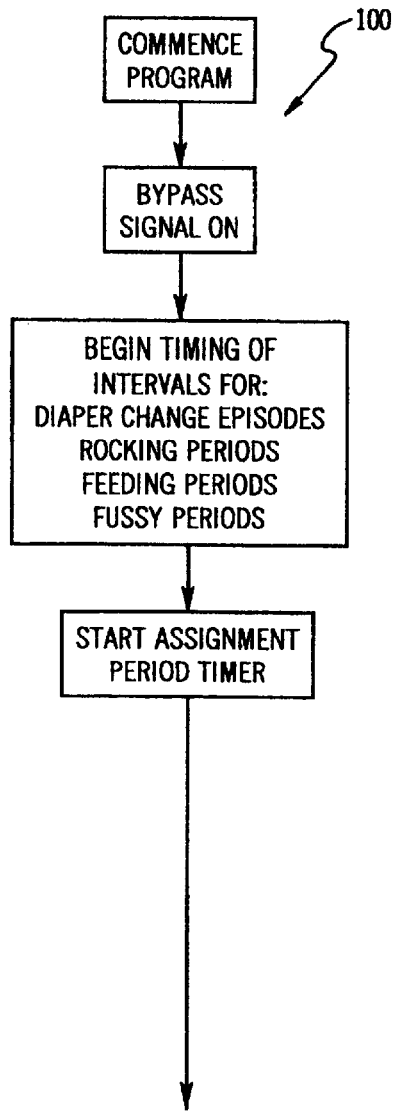
FIGS. 2a–2j are a flowchart of one embodiment of the infant simulator.
Figure 2B:
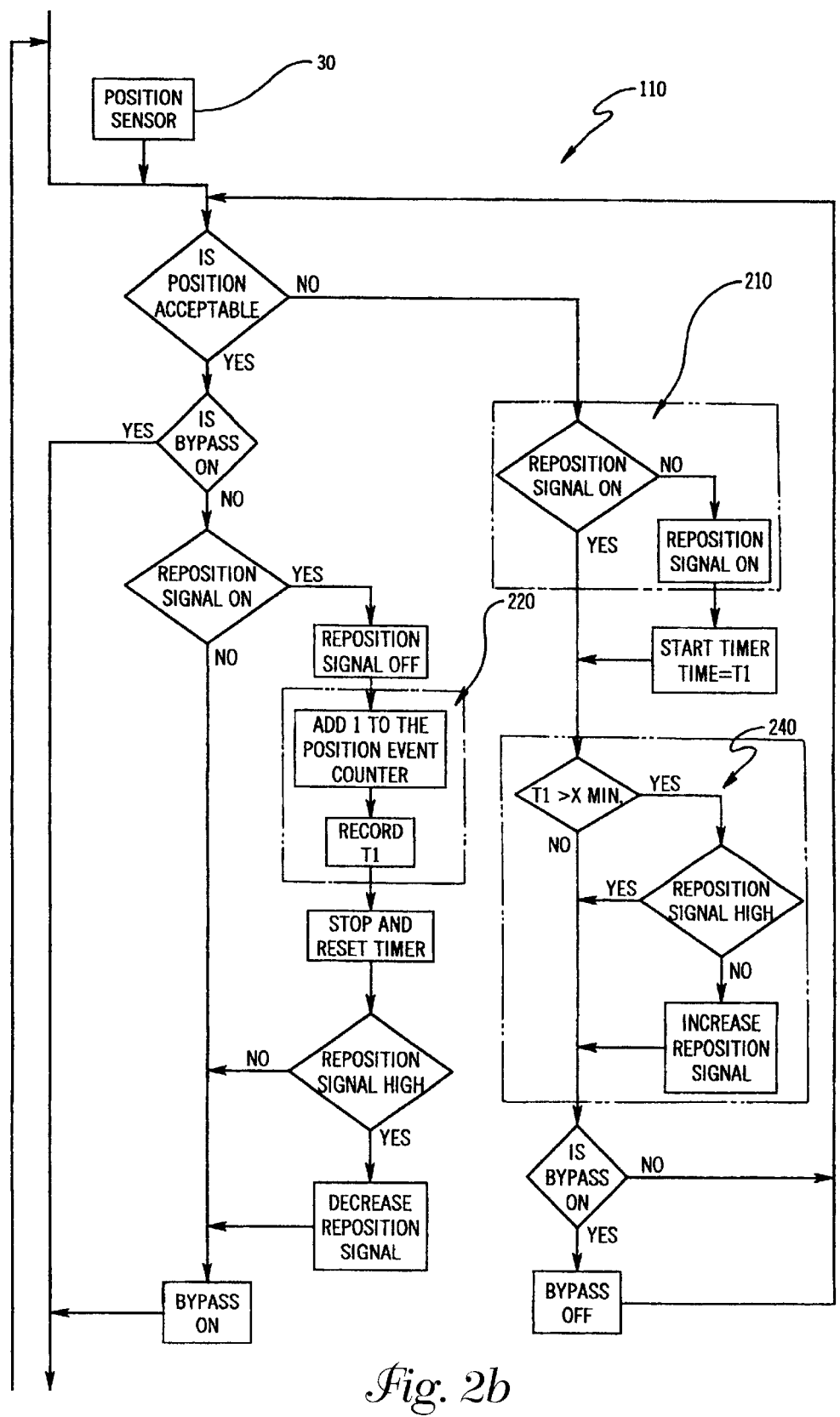

Referring to FIG. 2b, the position module 110 is bypassed so long as the infant simulator 05 is in an acceptable position. However, when the position module 110 receives a signal from the position sensor 30 that the infant simulator 05 is in an unacceptable position, the position module 110 initiates generation of the repositioning-request signal $S_1$ by means of the demand signal generating feature 210 embedded within the module 110, starts timing the length of time the repositioning-request signal $S_1$ is generated, and turns OFF the bypass signal →.

If the repositioning-request signal $S_1$ is generated for a predetermined time x (e.g., 10 minutes), the position module 110 increases the intensity of the repositioning-request signal $S_1$ by means of the escalating demand feature 240 embedded within the position module 110. The repositioning-request signal $S_1$ is generated at the increased intensity thereafter until the infant simulator 05 is returned to an acceptable position.

Once the infant simulator 05 is returned to an acceptable position, generation of the repositioning-request signal $S_1$ is turned OFF, the occurrence of a repositioning-request episode is counted, the duration of time during which the infant simulator 05 was in an unacceptable position (ie., the length of time the repositioning-request signal $S_1$ was generated) recorded by the recording feature 220, the repositioning-request episode timer is stopped and reset, the intensity of the repositioning-request signal $S_1$ is checked and returned to normal if intensified, the bypass signal → is turned back ON, and the position module 110 is exited.

Temperature Module 120

The temperature sensor 40 measures the temperature of the infant simulator 05 and signals the temperature module 120 when the temperature falls outside an acceptable temperature range (i.e., less than 15° C. or greater than 35° C.).

Figure 2C:
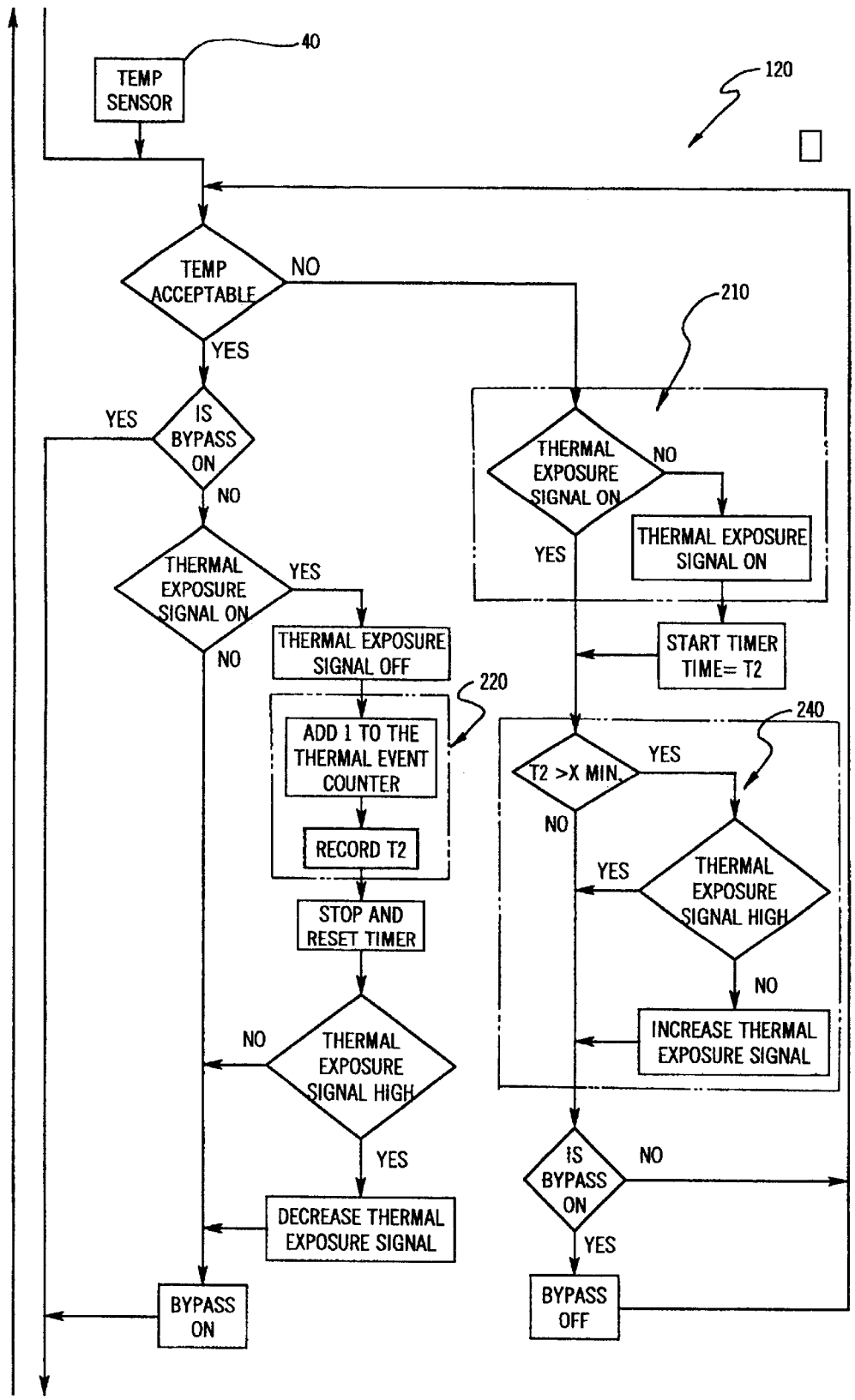

Referring to FIG. 2c, the temperature module 120 is bypassed so long as the infant simulator 05 is kept at a temperature within the acceptable temperature range. However, when the temperature module 120 receives a signal that the infant simulator 05 is being exposed to an unacceptable temperature, the temperature module 120 initiates generation of the thermal exposure signal $S_2$ by means of the demand signal generating feature 210 embedded within the temperature module 120, starts timing the length of time the thermal exposure signal $S_2$ is generated, and turns OFF the bypass signal →.

If the thermal exposure signal $S_2$ is generated for a predetermined time x (e.g., 10 minutes), the temperature module 120 increases the intensity of the thermal exposure signal $S_2$ by means of the escalating demand feature 240 embedded within the temperature module 120. The thermal exposure signal $S_2$ is generated at the increased intensity thereafter until the infant simulator 05 is returned to an acceptable temperature.

Once the infant simulator 05 is returned to an acceptable temperature, generation of the thermal exposure signal $S_2$ is turned OFF, the occurrence of a thermal exposure episode is counted, the duration of time during which the infant simulator 05 was exposed to unacceptable temperatures (i.e., the length of time the thermal exposure signal $S_2$ was generated) is recorded by the recording feature 220, the thermal exposure episode timer is stopped and reset, the intensity of the thermal exposure signal $S_2$ is checked and returned to normal if intensified, the bypass signal → is turned back ON, and the temperature module 120 is exited.

Compression Module 130

As shown in FIG. 3, the compression sensing system 50 detects a compression of the doll's head 11. When compression is detected by the compression sensing system 50, the compression sensing system 50 signals the compression module 130.

Figure 2D:
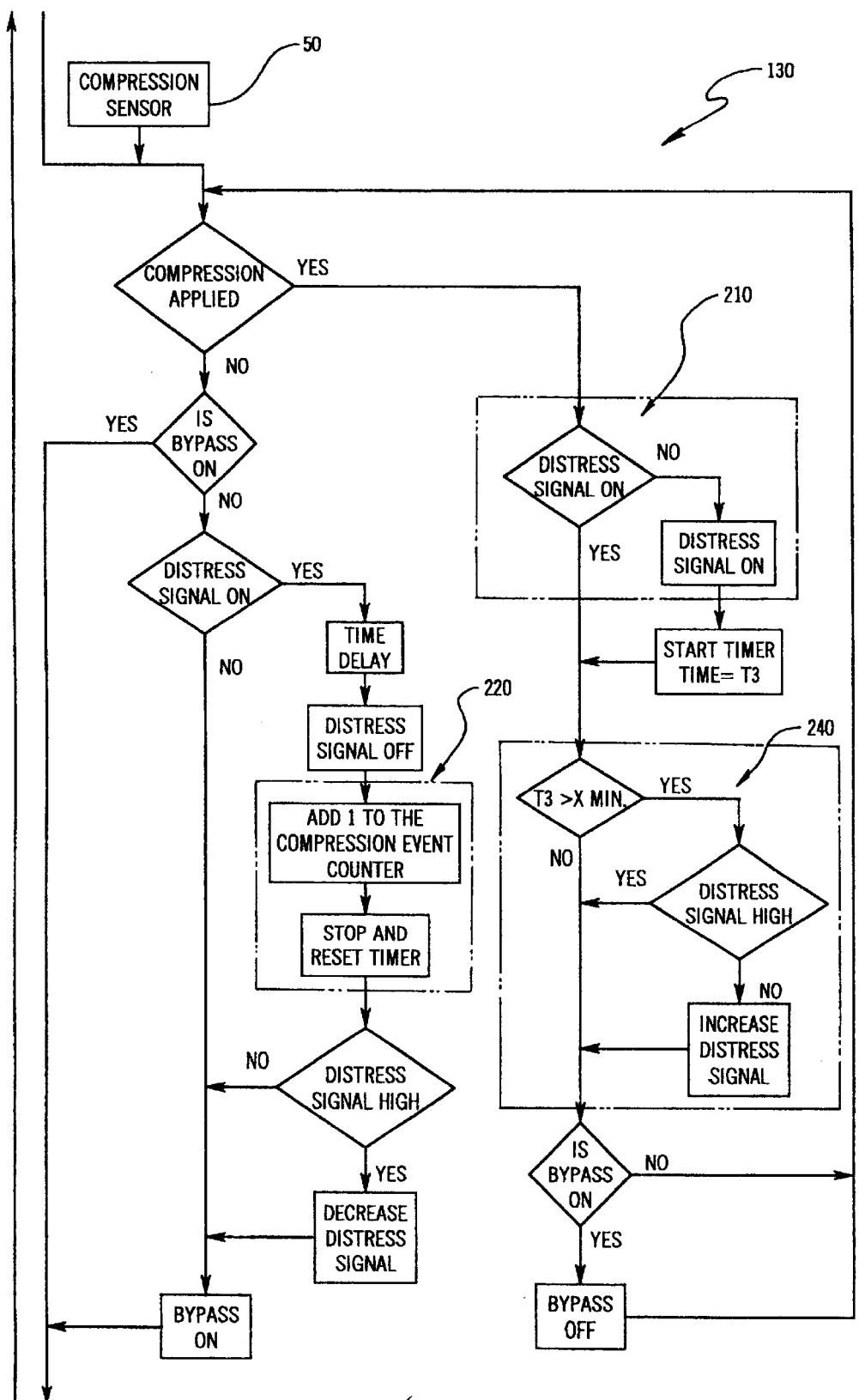

Referring to FIG. 2d, the compression module 130 is bypassed so long as the head 11 of the infant simulator 05 is not being squeezed or compressed. However, when the compression module 130 receives a signal that the head 11 of the infant simulator 05 is being compressed, the compression module 130 initiates generation of the distress signal $S_3$ by means of the demand signal generating feature 210 embedded within the compression module 130, starts timing the length of time the distress signal $S_3$ is generated, and turns OFF the bypass signal →.

If the duration of the compression, as measured by the length of time the distress signal $S_3$ has been generated, exceeds a predetermined time value x (e.g., 10 seconds), the compression module 130 increases the intensity of the distress signal $S_3$ by means of the escalating demand feature 240 embedded within the compression module 130. The distress signal $S_3$ is generated at the increased intensity thereafter until some period of time after compression of the head 11 has ceased.

Once compression of the infant simulator 05 is ceased, the distress signal $S_3$ continues for some period of time (e.g., 15 minutes) to simulate injury to the infant simulator 05. Thereafter, generation of the distress signal $S_3$ is turned OFF, the occurrence of a compression episode is counted by the recording feature 220, the compression timer is stopped and reset, the intensity of the distress signal $S_3$ is checked and returned to normal if intensified, the bypass signal → is turned back ON, and the compression module 130 is exited.

Diaper-Change Module 140

The central microcontroller unit 20 periodically changes the satisfaction signal $St_4$ requested by the diaper-change module 140, such as by alternating between a first satisfaction signal $St_4^+$ transmitted by a first diaper 60a, and a second satisfaction signal $St_4^-$ transmitted by a second diaper 60b.

The time intervals between sequential diaper-change episodes is preferably selected so as to emulate the frequency of diaper changes required by an actual infant. By way of example, when the intervals are a predetermined value, the intervals are preferably between about 20 minutes and 6 hours, and when the intervals are bounded random variables, the intervals are preferably between a minimum of 1 to 2 hours and a maximum of 4 to 6 hours, with a statistical preference for a time interval between approximately 2 and approximately 4 hours.

Figure 2E:
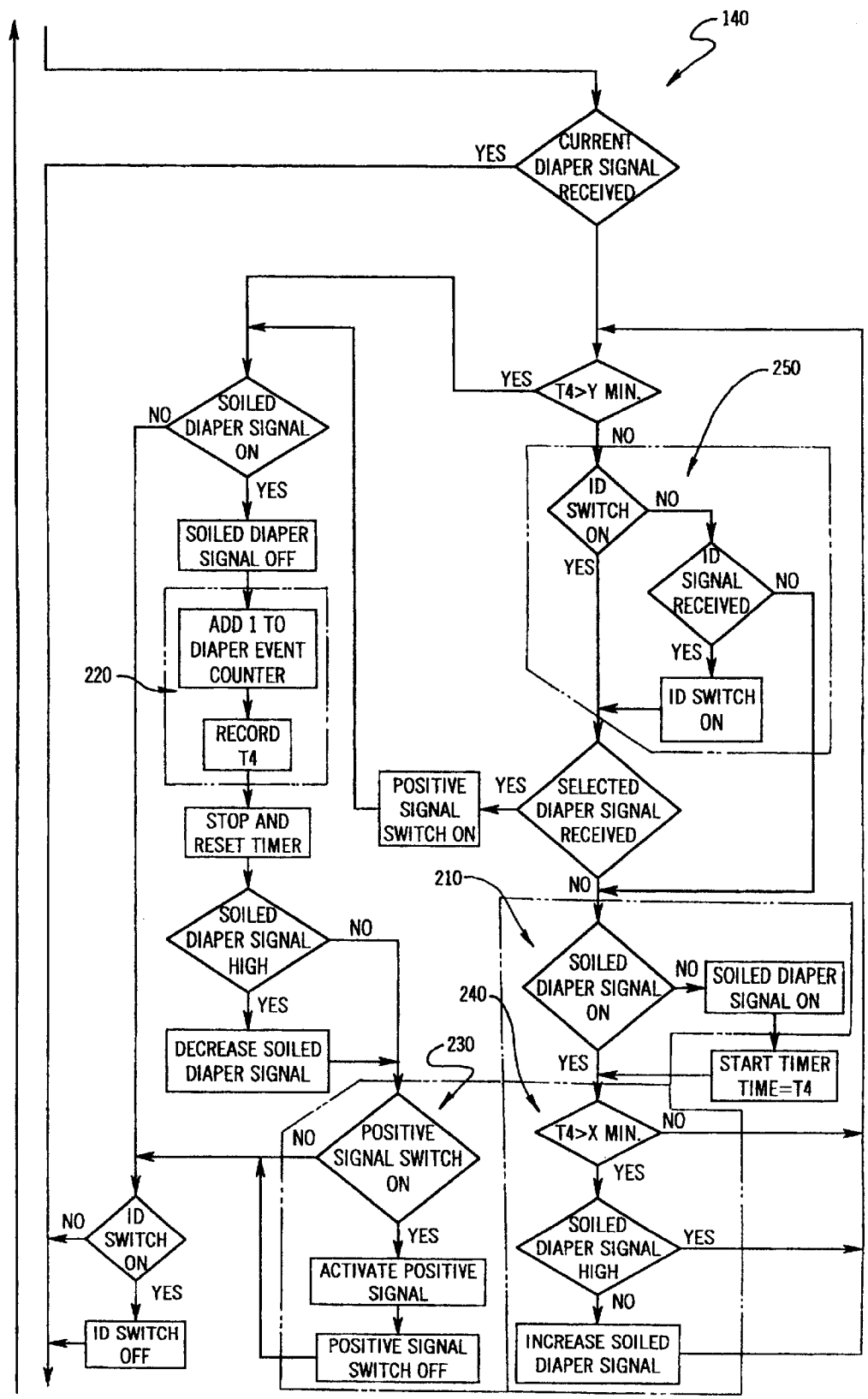

Referring to FIG. 2e, the diaper-change module 140 checks for the currently requested diaper-change satisfaction signal (e.g., $St_4^+$). The diaper-change module 140 is bypassed so long as the currently requested diaper-change satisfaction signal $St_4$ is communicated to the diaper-change module 140.

In the event that either the currently requested diaper-change satisfaction signal $St_4$ is no longer received by the diaper-change module 140 (e.g., the first diaper 60a transmitting the diaper-change satisfaction signal $St_4^+$ has been removed from the infant simulator 05), or the central microcontroller unit 20 has changed the requested diaper-change satisfaction signal $St_4$ (e.g., the requested diaper-change satisfaction signal has been changed from $St_4^+$ to $St_4^-$), the diaper-change module 140 initiates generation of a soiled-diaper signal $S_4$ by means of the demand signal generating feature 210 embedded within the diaper-change module 140, and starts timing the duration of the diaper-change episode by timing the length of time the soiled-diaper signal $S_4$ is generated.

In order to end a diaper-change episode before the time limitation y has been reached, the diaper-change module 140 must receive both an identification signal $S^{ID}$ (e.g., insertion of an identification key 90 attached to the wrist of the assigned care provider by means of a tamper indicating bracelet 91) and the currently requested satisfaction signal (e.g., transmission of the diaper-change satisfaction signal $St_4^-$ by diapering the infant simulator 05 with the second diaper 60b). For the embodiment depicted in FIG. 2e, the identification $S^{ID}$ and diaper-change satisfaction signals $St_4$ may be received in any sequence and do not need to be transmitted simultaneously.

As shown in FIG. 2e, the identification requirement is controlled by the identification system feature 250 embedded within the diaper-change module 140. The identification system feature 250 prevents exiting of the diaper-change module 140 by bypassing the satisfaction option until the identification signal $S^{ID}$ has been received and the identification switch $Sw^{ID}$ has been turned ON.

If the identification signal $S^{ID}$ and the current diaper-change satisfaction signal $St_4$ are not received within a given time limit x, as measured by the length of time the soiled-diaper signal $S_4$ has been generated, the diaper-change module 140 increases the intensity of the soiled-diaper signal $S_4$ by means of the escalating demand feature 240 embedded within the diaper-change module 140. The soiled-diaper signal $S_4$ is generated at the increased intensity for the remainder of the diaper-change episode (i e., until the identification signal $S^{ID}$ and the current diaper-change satisfaction signal $St_4$ are received or the time limitation y is reached).

Upon receiving the identification signal $S^{ID}$) and the current diaper-change satisfaction signal $St_4$, the soiled-diaper signal $S_4$ is turned OFF, the occurrence of a diaper-change episode is counted and the length of the diaper-change episode recorded by the recording feature 220, the timer for timing the duration of the diaper-change episode is stopped and reset the intensity of the distress signal $S_3$ is checked and returned to normal if intensified, a contented signal + is generated (e.g., a soft "cooing" sound), the identification switch $Sw^{ID}$ is turned back OFF, and the diaper-change module 140 is exited.

In the event that the identification signal $S^{ID}$ and the current diaper-change satisfaction signal $St_4$ are never received during a diaper-change episode (i. e., the soiled-diaper signal $S_4$ is generated until time limitation y is reached), the soiled-diaper signal $S_4$ is turned OFF, the occurrence of a diaper-change episode is counted and the length of the diaper-change episode recorded by the recording feature 220, the timer for timing the duration of the diaper-change episode is stopped and reset, the intensity of the soiled-diaper signal $S_4$ is checked and returned to normal if intensified, the identification switch $Sw^{ID}$ is turned back OFF, and the diaper-change module 140 is exited. The contented signal + is not generated when the diaper-change module 140 is exited in this manner.

The time limitation y is employed for purposes of preventing the soiled-diaper signal $S_4$ from being generated for the remainder of an assignment period in the event that the identification signal $S^{ID}$ and the current diaper-change satisfaction signal $St_4$ are never received by the diaper-change module 140. This allows the program to continue cycling through the other modules and interact with a care provider for the balance of the assignment period when an otherwise willing care provider is unable to provider the diaper-change satisfaction signal $St_4$, such as could result from a situation in which one of the diapers 60 is misplaced during an assignment period or left at home when traveling.

Rocking Module 150

The central microcontroller unit 20 periodically commences a rocking period and communicates the commencement of a rocking period to the rocking module 150. The central microcontroller unit 20 also controls the duration of each rocking period by transmitting a termination signal to the rocking module 150 after the desired time period has lapsed.

The time intervals between sequential rocking-request episodes is preferably selected so as to emulate the frequency of requests for attention requested by an actual infant. By way of example, when the intervals are a predetermined value, the intervals are preferably between about 1 to 6 hours, and when the intervals are bounded random variables, the intervals are preferably between a minimum of 1 to 2 hours and a maximum of 4 to 6 hours, with a statistical preference for a time interval between approximately 3 and approximately 5 hours.

Similarly, the duration of each rocking period is preferably selected so as to emulate the length of time an actual infant would request attention. By way of example, when the duration of a rocking period is a predetermined value, the duration of each rocking period is preferably between about 10 minutes to 1 hour, and when the duration of a rocking period is a bounded random variable, the duration of each rocking period is preferably between a minimum of about 2 minutes and a maximum of about 60, with a statistical preference for a duration between approximately 5 and 20 minutes.

Figure 2F:
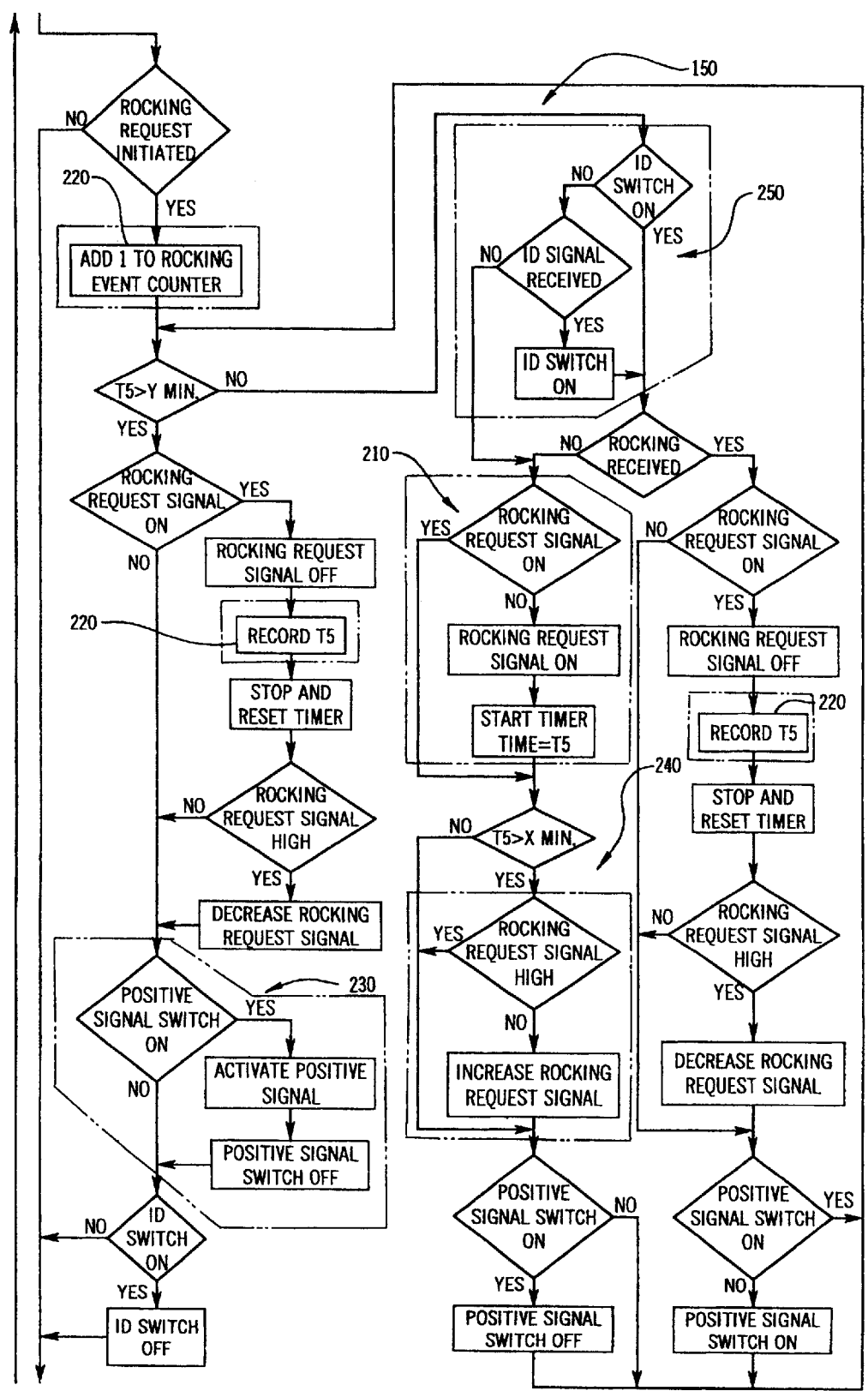

Referring to FIG. 2f, the rocking module 150 is simply bypassed until the central microcontroller unit 20 starts a rocking period. When the central microcontroller unit 20 starts a rocking period, the central microcontroller unit 20 transmits a rocking-request start signal to the rocking module 150, a rocking-request episode is counted, and the rocking-request episode commenced. The rocking module 150 then initiates generation of the rocking-request signal $S_5$ by means of the demand signal generating feature 210, and starts timing the duration of the rocking-request episode by timing the length of time the rocking-request signal $S_5$ is generated.

In order to end a rocking-request episode before the entire rocking period has elapsed, the rocking module 150 must receive both an identification signal $S^{ID}$ (e.g., insertion of an identification key 90 attached to the wrist of the assigned care provider by a tamper indicating bracelet 91) and a rocking-request satisfaction signal $St_5$ (e.g., rocking of the infant simulator 05). For the embodiment depicted in FIG. 2f, the identification $S^{ID}$ and rocking-request satisfaction $St_5$ signals may be received in any sequence and do not need to be transmitted simultaneously. However, the rocking-request satisfaction signal $St_5$ must be continuously received throughout the rocking period to prevent initiation of a secondary rocking-request episode in which the rocking-request signal $S_5$ is turned back ON and the duration of the supplemental rocking-request episode timed.

As shown in FIG. 2f, the identification requirement is controlled by the identification system feature 250 embedded within the rocking module 150. The identification system feature 250 prevents access to the episode termination operations (i.e., turning OFF the rocking-request signal $S_5$ and terminating timing of the rocking-request episode) by bypassing the satisfaction option until the identification signal $S^{ID}$ has been received and the identification switch $Sw^{ID}$) has been turned ON.

If the identification signal $S^{ID}$ and the rocking-request satisfaction signal $St_5$ are not received within a given time limit x, as measured by the length of time the rocking-request signal $S_5$ has been generated, the rocking module 150 increases the intensity of the rocking-request signal $S_5$ by means of the escalating demand feature 240 embedded within the rocking module 150. The rocking-request signal $S_5$ is generated at the increased intensity for the remainder of the rocking-request episode (i.e., until the identification signal $S^{ID}$ and the rocking-request satisfaction signal $St_5$ are received or the end of the rocking period is reached).

Upon receiving the identification $S^{ID}$ and the rocking-request satisfaction $St_5$ signals, the rocking-request signal $S_5$ is turned OFF, the length of the rocking-request episode recorded by the recording feature 220, the timer for timing the duration of the rocking-request episode stopped and reset, the intensity of the rocking-request signal $S_5$ checked and returned to normal if intensified and the positive signal switch turned ON unless already ON.

In contrast to the diaper-change module 140, the rocking module 150 requires that the rocking-request satisfaction signal $St_5$ continue to be transmitted to the rocking module 150 for the entire duration of the rocking period. Failure to continuously provide the rocking-request satisfaction signal $St_5$ throughout the entire rocking period causes the rocking module 150 to reinitiate generation of the rocking-request signal $S_5$, start timing the duration of the secondary rocking-request episode and turn the positive signal switch OFF.

In order to end a secondary rocking-request episode before the end of the rocking period, the rocking-request satisfaction signal $St_5$ must once again be received by the rocking module 150. It is not necessary to retransmit the identification signal $S^{ID}$ as the identification switch $Sw^{ID}$ remains ON until the rocking period has ended, regardless of the status of the rocking-request satisfaction signal $St_5$.

When the end of the rocking period is reached, the rocking module 150 performs one of two different sets of operations depending upon the final status of the rocking-request satisfaction signal $St_5$. In those cases where the rocking-request satisfaction signal $St_5$ was being received by the rocking module 150 at the end of the rocking period, a contented signal +is generated (e.g., a soft "cooing" sound), the identification switch $Sw^{ID}$ is turned back OFF, and the rocking module 150 is exited. In those cases where the rocking-request satisfaction signal $St_5$ was not being received by the rocking module 150 at the end of the rocking period, including those cases where the rocking-request satisfaction signal $St_5$ was never received by the rocking module 150, the rocking-request signal $S_5$ is turned OFF, the length of the rocking-request or supplemental rocking-request episode is recorded by the recording feature 220, the timer for timing the duration of the rocking-request episode is stopped and reset, the intensity of the rocking-request signal $S_5$ is checked and returned to normal if intensified, the identification switch $Sw^{ID}$ is turned back OFF, and the rocking module 150 is exited. The contented signal + is not generated when the rocking module 150 is exited in the later manner.

Feeding Module 160

The central microcontroller unit 20 periodically commences a feeding period and communicates the commencement of a feeding period to the feeding module 160. The central microcontroller unit 20 also controls the duration of each feeding period by transmitting a termination signal to the feeding module 160 after the desired time period has lapsed.

The time intervals between sequential feeding-request episodes is preferably selected so as to emulate the frequency of feedings required by an actual infant. By way of example, when the intervals are a predetermined value, the intervals are preferably between about 1 to 6 hours, and when the intervals are bounded random variables, the intervals are preferably between a minimum of 1 to 2 hours and a maximum of 4 to 6 hours, with a statistical preference for a time interval between approximately 3 and approximately 5 hours.

Similarly, the duration of each feeding period is preferably selected so as to emulate the length of time an actual infant would need to be feed. By way of example, when the duration of a feeding period is a predetermined value, the duration of each rocking period is preferably between about 5 to 20 minutes, and when the duration of a rocking period is a bounded random variable, the duration of each rocking period is preferably between a minimum of about 5 minutes and a maximum of about 30, with a statistical preference for a duration between approximately 10 and 20 minutes.

Figure 2G:
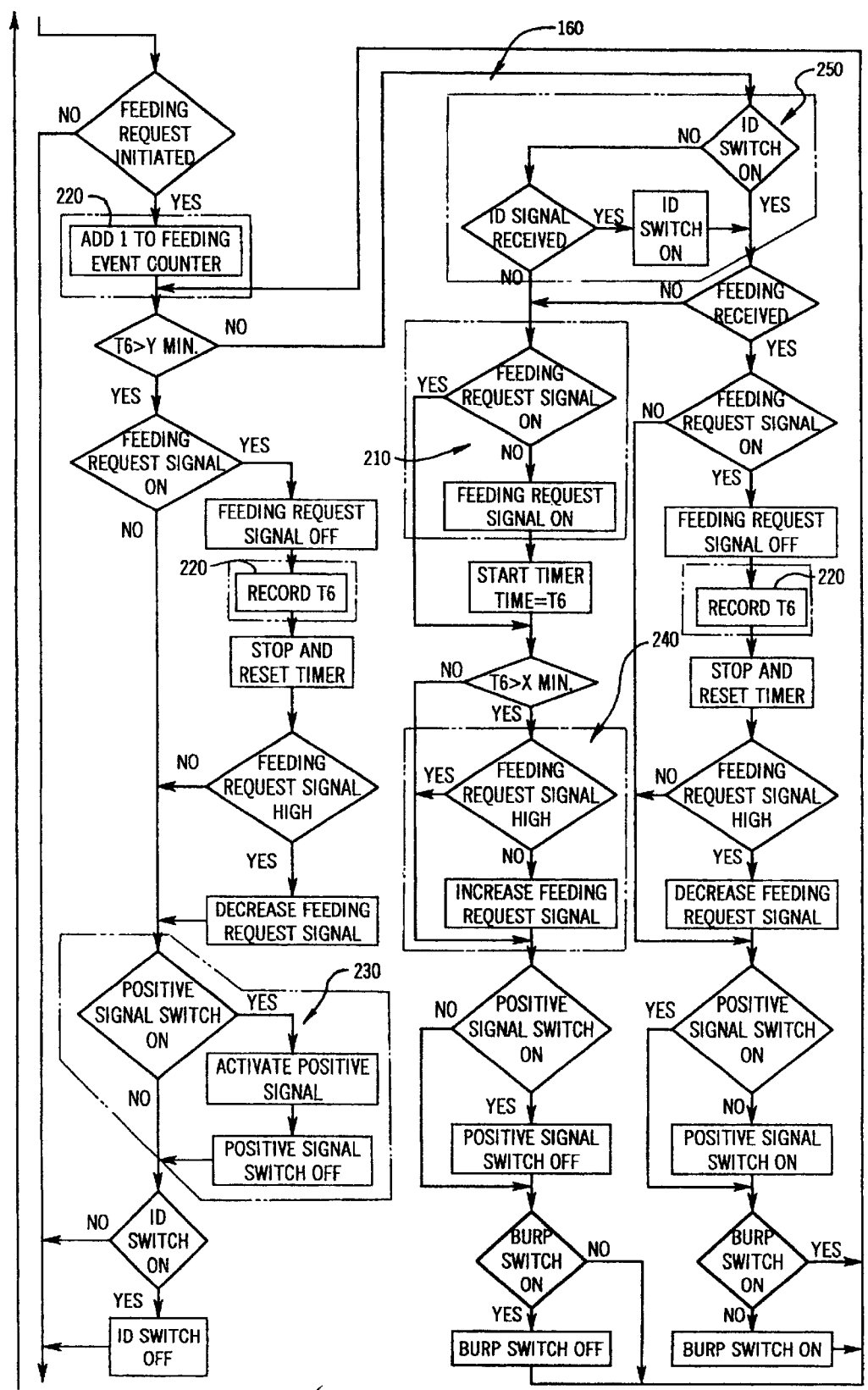

Referring to FIG. 2g, the feeding module 160 is simply bypassed until the central microcontroller unit 20 starts a feeding period. When the central microcontroller unit 20 starts a feeding period, the central microcontroller unit 20 transmits a feeding-request start signal to the feeding module 160, a feeding-request episode is counted, and the feeding-request episode commenced. The feeding module 160 then initiates generation of the feeding-request signal $S_6$ by means of the demand signal generating feature 210, starts timing the duration of the feeding-request episode by timing the length of time the feeding-request signal $S_6$ is generated, and turns the burp switch $Sw^{BURP}$ OFF unless the switch is already OFF.

In order to end a feeding-request episode before the entire feeding period has elapsed, the feeding module 160 must receive both an identification signal $^{ID}$ (e.g., insertion of an identification key 90 attached to the wrist of the assigned care provider by a tamper indicating bracelet 91) and a feeding-request satisfaction signal $St_6$ (e.g., insertion of a key marked "Feeding"). For the embodiment depicted in FIG. 2g, the identification $S^{ID}$ and feeding-request satisfaction $St_6$ signals may be received in any sequence and do not need to be transmitted simultaneously. However, the feeding-request satisfaction signal $St_6$ must be continuously received throughout the feeding period to prevent initiation of a secondary feeding-request episode in which the feeding-request signal $S_6$ is turned back ON, the duration of the supplemental feeding-request episode timed, and the burp switch $Sw^{BURP}$ switched back to OFF.

As shown in FIG. 2g, the identification requirement is controlled by the identification system feature 250 embedded within the rocking module 150. The identification system feature 250 prevents access to the episode termination operations (i.e., turning OFF the feeding-request signal $S_6$ and terminating timing of the feeding-request episode) by bypassing the satisfaction option until the identification signal $S^{ID}$ has been received and the identification switch $Sw^{ID}$ has been turned ON.

If the identification signal $S^{ID}$ and the feeding-request satisfaction signal $St_6$ are not received within a given time limit x, as measured by the length of time the feeding-request signal $S_6$ has been generated, the feeding module 160 increases the intensity of the feeding-request signal $S_6$ by means of the escalating demand feature 240 embedded within the feeding module 160. The feeding-request signal $S_6$ is generated at the increased intensity for the remainder of the feeding-request episode (ie., until the identification signal $S^{ID}$ and the feeding-request satisfaction signal $St_6$ are received or the end of the feeding period is reached).

Upon receiving the identification $S^{ID}$ and the feeding-request satisfaction $St_6$ signals, the feeding-request signal $S_6$ is turned OFF, the length of the feeding-request episode recorded by the recording feature 220, the timer for timing the duration of the feeding-request episode stopped and reset, the intensity of the feeding-request signal $S_6$ checked and returned to normal if intensified, and the burp switch $Sw^{BURP}$ turned ON.

As with the rocking module 150, the feeding module 160 requires that the feeding-request satisfaction signal $St_6$ continue to be transmitted to the feeding module 160 for the entire duration of the feeding period. Failure to continuously provide the feeding-request satisfaction signal $St_6$ throughout the entire feeding period causes the feeding module 160 to reinitiate generation of the feeding-request signal $S_6$, and start timing the duration of the secondary feeding-request episode.

In order to end a secondary feeding-request episode before the end of the feeding period, the feeding-request satisfaction signal $St_6$ must once again be received by the feeding module 160. It is not necessary to retransmit the identification signal $S^{ID}$ as the identification switch $Sw^{ID}$ remains ON until the feeding period has ended, regardless of the status of the feeding-request satisfaction signal $St_6$.

When the end of the feeding period is reached, the feeding module 160 performs one of two different sets of operations depending upon the final status of the feeding-request satisfaction signal $St_6$. In those cases where the feeding-request satisfaction signal $St_6$ was being received by the feeding module 160 at the end of the feeding period, a contented signal + is generated (e.g., a soft "cooing" sound), the identification switch $Sw^{ID}$) is turned back OFF, and the feeding module 160 is exited. In those cases where the feeding-request satisfaction signal $St_6$ was not being received by the feeding module 160 at the end of the feeding period, including those cases where the feeding-request satisfaction signal $St_6$ was never received by the feeding module 160, the feeding-request signal $S_6$ is turned OFF, the length of the feeding-request or supplemental feeding-request episode is recorded by the recording feature 220, the timer for timing the duration of the feeding-request episode is stopped and reset, the intensity of the feeding-request signal $S_6$ is checked and returned to normal if intensified, the identification switch $Sw^{ID}$ is turned back OFF, and the feeding module 160 is exited. The contented signal + is not generated when the feeding module 160 is exited in the later manner.

Burping Module 170

A burping module 170 is sequentially positioned after the feeding module 160. During each feeding period, a burp switch $Sw^{BURP}$ is turned ON when the identification signal $S^{ID}$ and feeding-request satisfaction $St_6$ signals are received. The burp switch $Sw^{BURP}$ remains ON so long as the feeding-request satisfaction signal $St_6$ is continuously received by the feeding module 160 during the feeding period. In the event that the identification signal $S^{ID}$ and feeding-request satisfaction $St_6$ signals are never received by the feeding module 160, or the feeding-request satisfaction signal $St_6$ is interrupted and is not being received by the feeding module 160 when the feeding period ends, the burp switch $Sw^{BURP}$ is turned OFF.

Burping-request periods can be initiated immediately after the end of a satisfied feeding period or after a defined delay timed from the end of a satisfied feeding period. When a delay is provided between the end of a satisfied feeding period and the initiation of a burping period, the length of the delay is preferably selected so as to emulate the burping needs of an actual infant. By way of example, when the delays are a predetermined value, the delays are preferably between about 0 to 30 minutes, and when the delays are bounded random variables, the delays are preferably between about 0 to 30 minutes, with a statistical preference for delays of between approximately 2 and 10 minutes.

Similarly, the duration of each burping period is preferably selected so as to emulate the length of time an actual infant would need to be burped. By way of example, when the duration of a burping period is a predetermined value, the duration of each burping period is preferably between about 2 to 60 minutes, and when the duration of a burping period is a bounded random variable, the duration of each burping period is preferably between about 2 to 60 minutes with a statistical preference for a duration of between approximately 5 and 20 minutes.

Figure 2H:
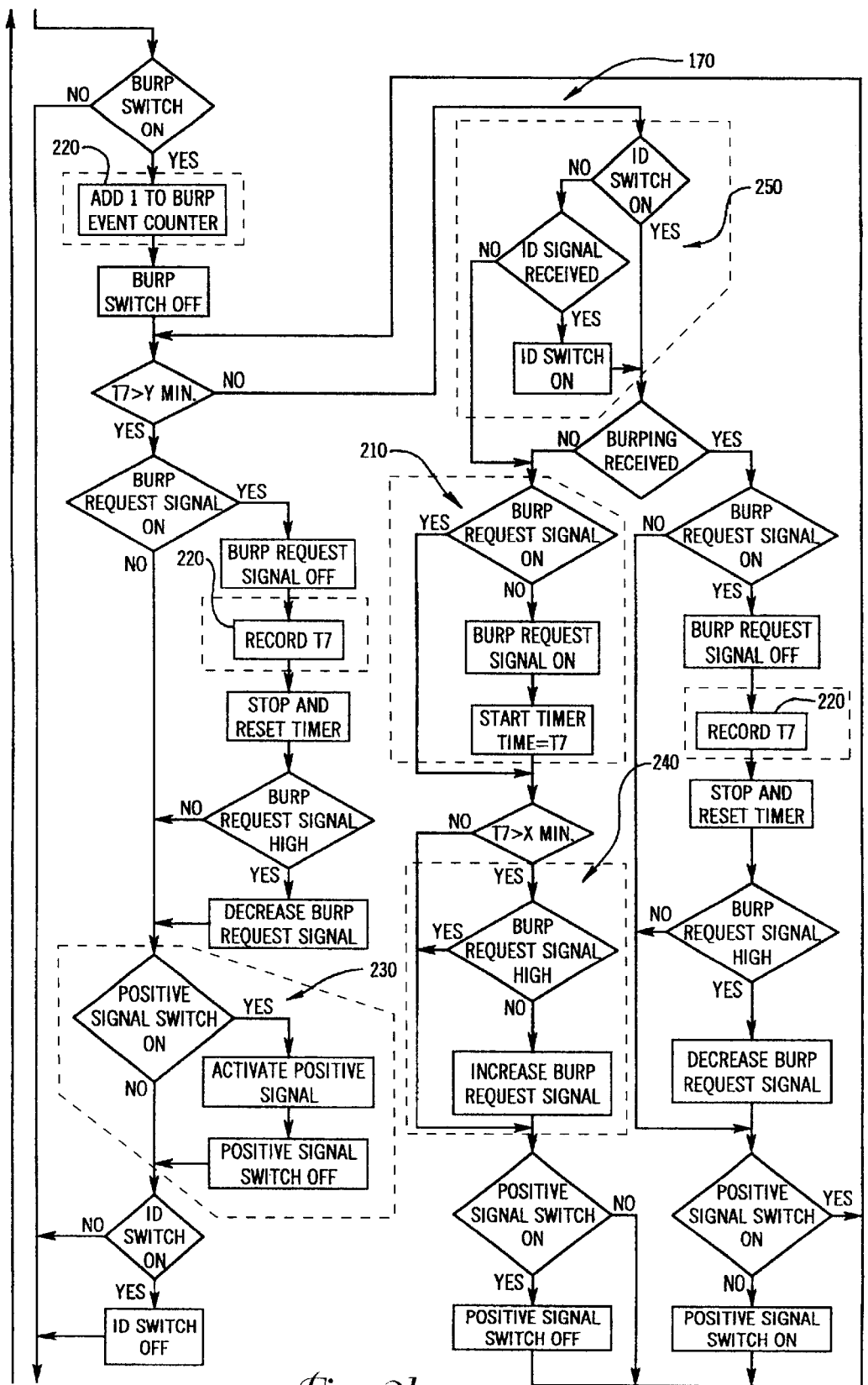

Referring to FIG. 2h, the burping module 170 is bypassed when the burping switch $Sw^{BURP}$ is OFF (i.e., the infant simulator 05 does not want to be burped when the infant simulator 05 was not properly feed). However, when the burping switch $Sw^{BURP}$ is ON, a burping-request episode is commenced and counted, and the burping switch $Sw^{BURP}$ switched OFF. The burping module 170 then initiates generation of the burping-request signal $S_7$ by means of the demand signal generating feature 210 embedded within the burping module 170 and starts timing the duration of the burping-request episode by timing the length of time the burping-request signal $S_7$ is generated.

As with the rocking period and the feeding period, the central microcontroller unit 20 controls the duration of each burping period by transmitting a termination signal to the burping module 170 after the desired time period has lapsed.

In order to end a burping-request episode before the entire burping period has elapsed, the burping module 170 must receive both an identification signal $S^{ID}$ (e.g., insertion of an identification key 90 attached to the wrist of the assigned care provider by a tamper indicating bracelet 91) and a burping-request satisfaction signal $St_7$ (e.g., patting of the infant simulator 05). For the embodiment depicted in FIG. 2h, the identification $S^{ID}$ and burping-request satisfaction $St_7$ signals may be received in any sequence and do not need to be transmitted simultaneously. However, the burping-request satisfaction signal $St_7$ must be continuously received throughout the burping period to prevent initiation of a secondary burping-request episode in which the burping-request signal $S_7$ is turned back ON and the duration of the supplemental burping-request episode timed.

As shown in FIG. 2h, the identification requirement is controlled by the identification system feature 250 embedded within the burping module 170. The identification system feature 250 prevents access to the episode termination operations (i.e., turning OFF the burping-request signal $S_7$ and terminating timing of the burping-request episode) by bypassing the satisfaction option until the identification signal $S^{ID}$ has been received and the identification switch $Sw^{ID}$ has been turned ON.

If the identification signal $S^{ID}$ and the burping-request satisfaction signal $St_7$ are not received within a given time limit x, as measured by the length of time the burping-request signal $S_7$ has been generated, the burping module 170 increases the intensity of the burping-request signal $S_7$ by means of the escalating demand feature 240 embedded within the burping module 170. The burping-request signal $S_7$ is generated at the increased intensity for the remainder of the burping-request episode (i.e., until the identification signal $S^{ID}$ and the burping-request satisfaction signal $St_7$ are received or the end of the burping period is reached).

Upon receiving the identification $S^{ID}$ and the burping-request satisfaction $St_7$ signals, the burping-request signal $S_7$ is turned OFF, the length of the burping-request episode recorded by the recording feature 220, the timer for timing the duration of the burping-request episode stopped and reset, and the intensity of the burping-request signal $S_7$ checked and returned to normal if intensified.

As with the rocking module 150 and the feeding module 160 the burping module 170 requires that the burping-request satisfaction signal $St_7$ continue to be transmitted to the burping module 170 for the entire duration of the burping period. Failure to continuously provide the burping-request satisfaction signal $St_7$ throughout the entire burping period causes the burping module 170 to reinitiate generation of the burping-request signal $S_7$, and start timing the duration of the secondary burping-request episode.

In order to end a secondary burping-request episode before the end of the burping period, the burping-request satisfaction signal $St_7$ must once again be received by the burping module 170. It is not necessary to retransmit the identification signal $S^{ID}$ as the identification switch $Sw^{ID}$ remains ON until the burping period has ended, regardless of the status of the burping-request satisfaction signal $St_7$.

When the end of the burping period is reached, the burping module 170 performs one of two different sets of operations depending upon the final status of the burping-request satisfaction signal $St_7$. In those cases where the burping-request satisfaction signal $St_7$ was being received by the burping module 170 at the end of the burping period, a contented signal + is generated (e.g., a soft "cooing" sound), the identification switch $Sw^{ID}$ is turned back OFF, and the burping module 170 is exited. In those cases where the burping-request satisfaction signal $St_7$ was not being received by the burping module 170 at the end of the burping period, including those cases where the burping-request satisfaction signal $St_7$ was never received by the burping module 170, the burping-request signal $S_7$ is turned OFF, the length of the burping-request or supplemental burping-request episode is recorded by the recording feature 220, the timer for timing the duration of the burping-request episode is stopped and reset, the intensity of the burping-request signal $S_7$ is checked and returned to normal if intensified, the identification switch $Sw^{ID}$ is turned back OFF, and the burping module 170 is exited. The contented signal + is not generated when the burping module 170 is exited in the later manner.

Fussy Module 180

The central microcontroller unit 20 periodically commences a fussy period and communicates the commencement of a fussy period to the fussy module 180. The program also controls the duration of each fussy period by transmitting a termination signal to the fussy module 180 after the desired time period has lapsed.

The duration of each fussy period is preferably selected so as to emulate the length of time an actual infant would tend to fuss. By way of example, when the duration of a fussy period is a predetermined value, the duration of fussy period is preferably between about 5 to 20 minutes, and when the duration of a fussy period is a bounded random variable, the duration of each fussy period is preferably between about 2 to 60 minutes with a statistical preference for a duration of about 5 to 20 minutes.

Figure 2I:
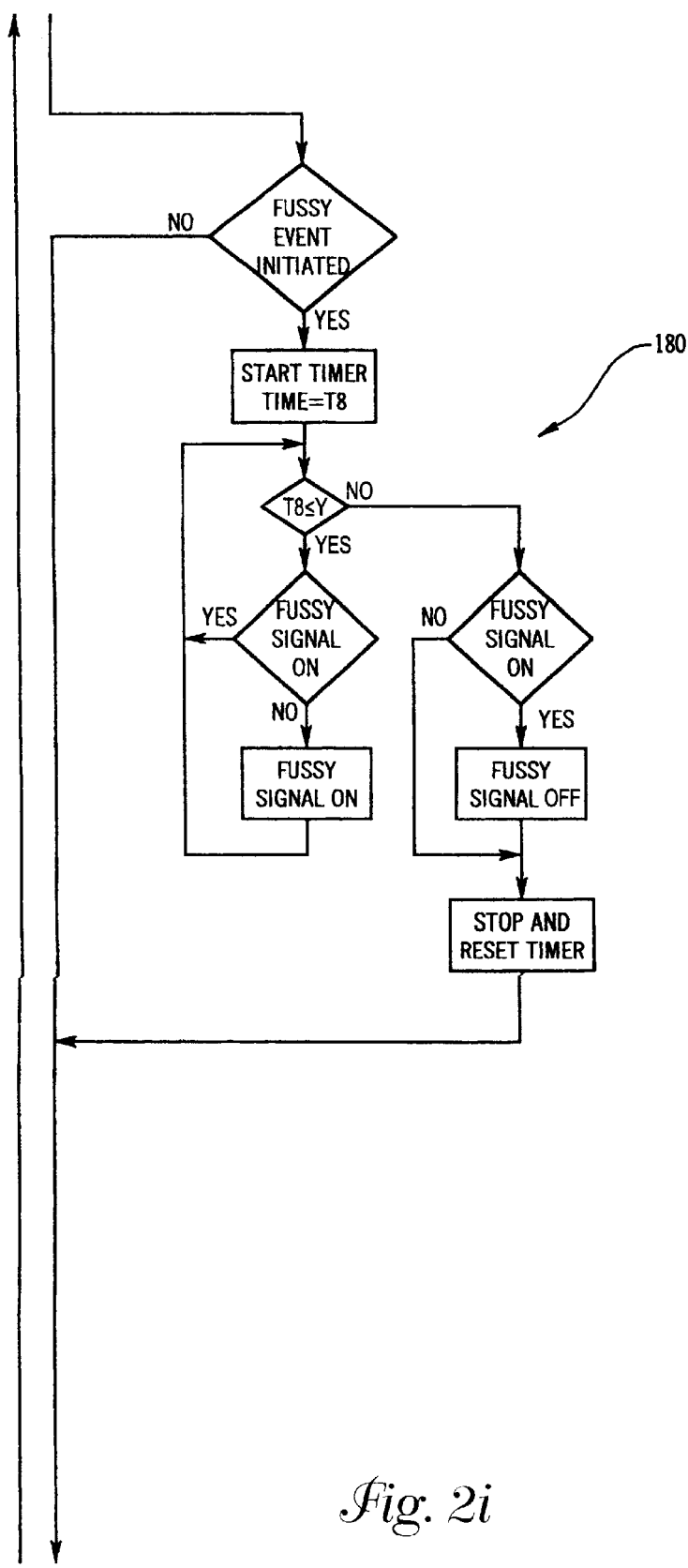
Figure 2J:
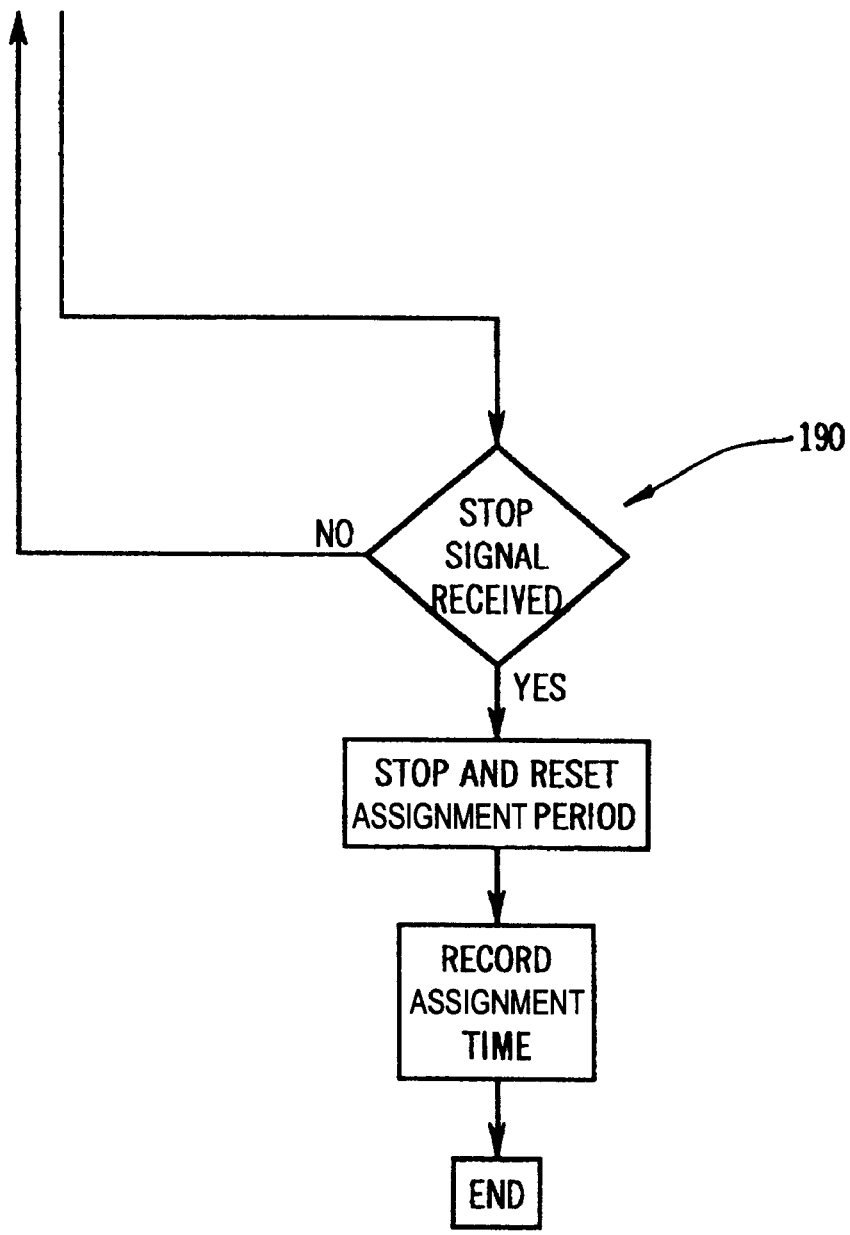

Referring to FIG. 2i, the fussy module 180 is simply bypassed until the central microcontroller unit 20 commences a fussy period. When the central microcontroller unit 20 commences a fussy period, the central microcontroller unit 20 transmits a fussy start signal to the fussy module 180, and a fussy episode is commenced. The fussy module 180 then initiates generation of the fussy signal $S_8$ by means of the demand signal generating feature 210 embedded within the fussy module 180.

In contrast to the other episodic modules (i.e., the diaper-change module 140, the rocking module 150, the feeding module 160 and the burping module 170) a fussy episode cannot be ended until the entire fussy period has run. Hence, the fussy signal $S_8$ will be generated throughout a fussy period regardless of the actions taken by the care provider. The fussy module 180 emulates those times when, despite every effort by a care provider, an infant cannot be satisfied and continues to fuss. Since the fussy episode cannot be satisfied, the fussy module 180 does not include the recording 220, contented signal 230, escalating demand 240 or identification 250 features embedded within the other modules.

When the end of the fussy period is reached, the fussy signal $S_8$ is turned OFF and the fussy module 180 is exited. A contented signal + is not generated.

Assignment Period Module 190

The infant simulator 05 initiates timing of the assignment period upon activation. The duration of the assignment period can either be continuous (i.e., continuing until a teacher or other program administrator takes custody of the infant simulator 05 and stops the assignment period), or predetermined (i.e., a preset duration of 6, 8, 24, 36, 48 or 72 hours selected by the teacher or other program administrator at the beginning of the assignment period.

When the assignment period is a predetermined time period, the central microcontroller unit 20 is preprogrammed with a defined assignment period. The assignment period module 190 compares the length of time the infant simulator 05 has been activated against the duration of the defined assignment period, and causes the program to continue cycling through the various modules until the length of time the infant simulator 05 has been activated equals or exceeds the duration of the defined assignment period. Once the activation period equals or exceeds the assignment period, the program is ended.

What is claimed is:

1. An infant simulator, comprising:
   (a) a doll;
   (b) a diaper-change system within the doll for periodically effecting a diaper-change episode, including at least:
      (i) a means for generating a perceptible soiled-diaper signal; and
      (ii) a means in communication with the soiled-diaper signal generating means for arresting the soiled-diaper signal in response to receipt of a diaper-changed signal; and
   (c) a diaper configured and arranged to be fitted over the lower torso of the doll as a diaper and having a means effective for transmitting the diaper-changed signal to the soiled-diaper signal arresting means when the diaper is fitted on the doll.

2. An infant simulator, comprising:
   (a) a doll;
   (b) a diaper-change system within the doll for periodically effecting a diaper-change episode, including at least:
      (i) a means for generating a perceptible soiled-diaper signal;
      (ii) a means for receiving a diaper-changed signal; and
      (iii) a means for measuring and recording the duration of the diaper-change episode measured from initial generation of the perceptible soiled-diaper signal to receipt of the diaper-changed signal by the diaper-changed signal receiving means; and
   (c) a diaper configured and arranged to be fitted over the lower torso of the doll as a diaper and having a means effective for transmitting the diaper-changed signal to the diaper-changed signal receiving means when the diaper is fitted on the doll.

3. The infant simulator of claim 1 or 2 further comprising a diaper-change interval timer in communication with the soiled-diaper signal generating means for initiating generation of sequential soiled-diaper signals at intervals.

4. The infant simulator of claim 3 wherein the time interval between the generation of sequential soiled-diaper signals is a random variable occurring within a predetermined time range.

5. The infant simulator of claim 4 further comprising a means for adjusting the potential duration of the time interval between the generation of sequential soiled-diaper signals at the beginning of an assignment period, whereby the potential number of soiled-diaper signals generated by the diaper-change system during an assignment period is correspondingly increased or decreased.

6. The infant simulator of claim 5 wherein the diaper-change interval duration-adjustment means is effective for adjusting the time interval between the generation of sequential soiled-diaper signals to one of at least three time interval options of short duration, average duration and long duration, whereby the infant simulator can be programmed to simulate the relative care requirements of an easy infant, an average infant and a difficult infant.

7. The infant simulator of claim 4 wherein the time interval between the generation of sequential soiled-diaper signals is between a minimum of 1 hour and a maximum of 6 hours.

8. The infant simulator of claim 3 wherein the time interval between the generation of sequential soiled-diaper signals is a predetermined value.

9. The infant simulator of claim 8 further comprising a means for adjusting the duration of the time interval between the generation of sequential soiled-diaper signals at the beginning of an assignment period, whereby the number of soiled-diaper signals generated by the diaper-change system during an assignment period is correspondingly increased or decreased.

10. The infant simulator of claim 9 wherein the diaper-change time interval-duration adjustment means is effective for adjusting the time interval between the generation of sequential soiled-diaper signals to one of at least three time interval options of short duration, average duration and long duration, whereby the infant simulator can be programmed to simulate the relative care requirements of an easy infant, an average infant and a difficult infant.

11. The infant simulator of claim 3 wherein the time interval between the generation of sequential soiled-diaper signals is between 20 minutes and 6 hours.

12. The infant simulator of claim 1 further comprising a care-provider identification system within the doll, including at least (i) a means for receiving an identification signal from a user, and (ii) a means in communication with the identification-signal receiving means and the diaper-change system effective for preventing arresting of the soiled-diaper signal until the identification signal is received by the identification-signal receiving means.

13. The infant simulator of claim 12 wherein the identification-signal receiving means is selected from a voice recognition system or a fingerprint recognized system.

14. The infant simulator of claim 12 wherein the identification-signal receiving means comprises a keyhole effective for transmitting the identification signal upon insertion of an identification key; and the infant simulator further comprises an identification key effective for transmitting the identification signal when inserted into the keyhole, and a means for attaching the identification key to a selected care-provider capable of indicating detachment of the identification key from the selected care-provider.

15. The infant simulator of claim 1 further comprising a means effective for measuring and recording the duration of the diaper-change episode.

16. The infant simulator of claim 2 or 15 wherein the diaper-change episode measuring and recording means is effective for measuring and recording the sum total of the duration of all diaper-change episodes occurring within an assignment period.

17. The infant simulator of claim 2 or 15 wherein the diaper-change episode measuring and recording means is effective for measuring and separately recording the duration of each and every diaper-change episode occurring within an assignment period.

18. The infant simulator of claim 1 or 15 wherein (i) the infant simulator further includes at least two diapers, with each diaper equipped with a means effective for transmitting a different diaper-changed signal, and (ii) the means for arresting the soiled-diaper signal alternates between the different diaper-changed signals as the signal effective for arresting the soiled-diaper signal.

19. The infant simulator of claim 1 or 2 further comprising a means in communication with the soiled-diaper signal generating means for escalating the intensity of the soiled-diaper signal as the duration of the diaper-change episode increases.

20. The infant simulator of claim 19 wherein the soiled-diaper signal intensity-escalating means is effective for escalating the intensity of the soiled-diaper signal to at least two higher intensity soiled-diaper signals.

21. The infant simulator of claim 1 or 2 wherein the infant simulator has an approximate shape and weight of an infant.

22. The infant simulator of claim 1 or 2 further comprising an energy source retained within the doll for supplying the energy requirements of the simulator, and a means for indicating that the energy source has been accessed.

23. The infant simulator of claim 1 or 2 wherein the perceptible soiled-diaper signal is expressed as an audible cry.

24. The infant simulator of claim 2 wherein the perceptible soiled-diaper signal is expressed as a wetted diaper.

25. The infant simulator of claim 2 further comprising a care-provider identification system within the doll, including at least (i) a means for receiving an identification signal wherein the identification signal is different from the satisfaction signal, and (ii) a means in communication with the identification-signal receiving means and the diaper-change system effective for preventing receipt of the diaper-changed signal by the diaper-changed signal receiving means such that the duration of the diaper-change episode continues to be measured even though the diaper-changed signal is being transmitted to the diaper-changed signal receiving means.

26. The infant simulator of claim 2 wherein (i) the infant simulator further includes at least two diapers, with each diaper equipped with a means effective for transmitting a different diaper-changed signal, and (ii) the diaper-changed signal receiving means alternates between the different diaper-changed signals as the signal capable of being received so as to end the diaper-change episode.

27. An infant simulator, comprising:
 (a) a doll;
 (b) a demand system within the doll for periodically effecting a demand episode, including at least:
  (i) a means for generating a perceptible demand signal;

(ii) a means in communication with the demand signal generating means for inhibiting the demand signal so long as a satisfaction signal produced only by a single predefined type of physical interaction with the doll is continuously received;

(iii) a demand duration timer in communication with the demand signal generating means for terminating generation of the demand signal at the end of a demand period; and (c) a feedback system within the doll for signaling a contented condition, including at least:

(i) a means for generating a perceptible contented signal;

(ii) a means for initiating generation of the contented signal in communication with both the demand system and the contented signal generating means, effective for initiating generation of the contented signal at the end of a demand period, provided the satisfaction signal is being received by the demand system at the end of the demand period;

(iii) whereby the contented signal denotes the end of the demand period and thereby indicates that the demand signal has been terminated and the satisfaction signal need no longer be continuously received by the satisfaction signal receiving means in order to prevent generation of the demand signal.

28. An infant simulator, comprising:

(a) a doll;

(b) a demand system within the doll for effecting a demand episode, including at least:

(i) a means for generating a perceptible demand signal;

(ii) a means for receiving a satisfaction signal and inhibiting the demand signal so long as the satisfaction signal is continuously received from a user;

(iii) a demand duration timer in communication with the demand signal generating means for terminating generation of the demand signal at the end of a demand period; and (iv) a means for measuring and recording the duration of each demand episode measured from initial generation of the perceptible demand signal to receipt of the satisfaction signal by the satisfaction signal receiving means from a user; and (c) a feedback system within the doll for signaling a contented condition, including at least:

(i) a means for generating a perceptible contented signal;

(ii) a means for initiating generation of the contented signal in communication with both the demand system and the contented signal generating means for initiating generation of the contented signal at the end of a demand period, provided the satisfaction signal is being received by the demand system at the end of the demand period; and (iii) whereby the contented signal denotes the end of the demand period and thereby indicates that the demand signal has been terminated and the satisfaction signal need no longer be continuously received by the satisfaction signal receiving means in order to prevent generation of the demand signal.

29. The infant simulator of claim 27 or 28 further comprising a means effective for transmitting the satisfaction signal to the demand signal arresting means when placed in communicative proximity to the doll.

30. The infant simulator of claim 27 or 28 further comprising a demand interval timer in communication with the demand signal generating means for initiating generation of the demand signal at intervals.

31. The infant simulator of claim 27 or 28 further comprising a care-provider identification system within the doll, including at least (i) a means for receiving an identification signal from a user, wherein the identification signal is different from the satisfaction signal, and (ii) a means in communication with the identification-signal receiving means and the demand system effective for preventing arresting of the demand signal until the identification signal is received by the identification-signal receiving means.

32. The infant simulator of claim 31 wherein the identification-signal receiving means comprises a voice recognition system.

33. The infant simulator of claim 31 wherein the identification-signal receiving means comprises a fingerprint recognition system.

34. The infant simulator of claim 31 wherein the identification-signal receiving means comprises a keyhole effective for transmitting the identification signal upon insertion of an identification key.

35. The infant simulator of claim 34 further comprising an identification key effective for transmitting the identification signal when inserted into the keyhole, wherein the identification key includes a means for attaching the identification key to a selected care-provider and a means for indicating detachment of the identification key from the selected care-provider.

36. The infant simulator of claim 27 further comprising a means effective for measuring and recording the duration of the demand episode.

37. The infant simulator of claim 27 or 28 further comprising a means in communication with the demand signal generating means for escalating the intensity of the demand signal as the duration of the demand episode increases.

38. The infant simulator of claim 27 or 28 wherein the infant simulator has an approximate shape and weight of an infant.

39. The infant simulator of claim 27 or 28 further comprising an energy source retained within the doll for supplying the energy requirements of the infant simulator, and a means for indicating that the energy source has been accessed.

40. The infant simulator of claim 27 or 28 wherein the perceptible demand signal is expressed as an audible signal.

41. The infant simulator of claim 27 or 28 wherein the demand signal arresting means is only effective for inhibiting the demand signal in response to receipt of the satisfaction signal, and the infant simulator further comprises a demand duration timer in communication with the demand signal generating means for terminating generation of the demand signal at the end of a demand period.

42. The infant simulator of claim 41 wherein the duration of the demand period is a random variable lasting for a time period falling within a predetermined time range.

43. The infant simulator of claim 42 further comprising a means for adjusting the potential duration of the demand period at the beginning of an assignment period.

44. The infant simulator of claim 41 wherein the duration of the demand period is a predetermined value.

45. The infant simulator of claim 44 further comprising a means for adjusting the duration the demand period at the beginning of an assignment period.

46. The infant simulator of claim 41 further comprising a contented signal delay timer in communication with the demand duration timer and the contented signal initiating means for delaying commencement of generation of the contented signal for a gratification delay period after termination of the demand signal.

47. The infant simulator of claim 46 wherein the gratification delay period is a random variable falling within a predetermined time range.

48. The infant simulator of claim 46 wherein the gratification delay period is a predetermined value.

49. The infant simulator of claim 27 or 28 wherein the perceptible contented signal is expressed as a signal selected from the group consisting of an audible laugh, an audible cooing, an audible sigh, a smile, movement of appendages, and a combination thereof.

50. The infant simulator of claim 27 or 28 further comprising a contented signal delay timer in communication with the contented signal initiating means for delaying commencement of generation of the contented signal, after the satisfaction signal is received by the demand system, for a gratification delay period.

51. The infant simulator of claim 50 wherein the gratification delay period is a random variable falling within a predetermined time range.

52. The infant simulator of claim 51 wherein the gratification delay period is between a minimum of 0 to 2 minutes and a maximum of 5 to 20 minutes, with a statistical preference for a time interval between approximately 2 and approximately 5 minutes.

53. The infant simulator of claim 50 wherein the gratification delay period is a predetermined variable.

54. The infant simulator of claim 53 wherein the gratification delay period is between 0 and 10 minutes.

55. An infant simulator, comprising:
(a) a doll;
(b) a demand system within the doll for effecting a demand episode, including at least:
(i) a means for generating a perceptible demand signal during the demand episode; and
(ii) a means in communication with the demand signal generating means for arresting the demand signal in response to receipt of a satisfaction signal provided by a user
(c) a means effective for transmitting the satisfaction signal to the demand signal arresting means when placed in communicative proximity to the doll; and
(d) a means in communication with the demand signal generating means for escalating the intensity of the demand signal as the duration of the demand episode increase, wherein the duration of the demand episode is measured from initial generation of the perceptible demand signal to receipt of the satisfaction signal by the satisfaction signal receiving means.

56. The infant simulator of claim 55 further comprising a care-provider identification system within the doll, including at least (i) a means for receiving an identification signal wherein the identification signal is different from the satisfaction signal from a user, and (ii) a means in communication with the identification-signal receiving means and the demand system effective for preventing arresting of the demand signal until the identification signal is received by the identification-signal receiving means.

57. The infant simulator of claim 56 wherein the identification-signal receiving means comprises a voice recognition system.

58. The infant simulator of claim 56 wherein the identification-signal receiving means comprises a fingerprint recognition system.

59. The infant simulator of claim 56 wherein the identification-signal receiving means comprises a keyhole effective for transmitting the identification signal upon insertion of an identification key.

60. The infant simulator of claim 59 further comprising an identification key effective for transmitting the identification signal when inserted into the keyhole, wherein the identification key includes a means for attaching the identification key to a selected care-provider and a means for indicating detachment of the identification key from the selected care-provider.

61. The infant simulator of claim 55 further comprising a means effective for measuring and recording the duration of the demand episode.

62. The infant simulator of claim 58 further comprising a means effective for measuring and recording the sum total of the duration of all demand episodes occurring within an assignment period.

63. The infant simulator of claim 58 further comprising a means effective for measuring and separately recording the duration of each and every demand episode occurring within an assignment period.

64. The infant simulator of claim 58 wherein the infant simulator has an approximate shape and weight of an infant.

65. The infant simulator of claim 58 wherein the demand signal intensity-escalating means is effective for escalating the intensity of the demand signal to at least two higher intensity demand signals.

66. The infant simulator of claim 58 further comprising an energy source retained within the doll for supplying the energy requirements of the infant simulator, and a means for indicating that the energy source has been accessed.

67. The infant simulator of claim 58 wherein the demand signal arresting means is only effective for inhibiting the demand signal in response to receipt of the satisfaction signal, and the infant simulator further comprises a demand duration timer in communication with the demand signal generating means for terminating generation of the demand signal at the end of a demand period.

68. The infant simulator of claim 67 wherein the duration of the demand period is a random variable lasting for a time period falling within a predetermined time range.

69. The infant simulator of claim 68 further comprising a means for adjusting the potential duration of the demand period at the beginning of an assignment period.

70. The infant simulator of claim 67 wherein the duration of the demand period is a predetermined value.

71. The infant simulator of claim 70 further comprising a means for adjusting the duration the demand period at the beginning of an assignment period.

72. The infant simulator of claim 55 wherein the satisfaction signal transmitting means is a key.

73. An infant simulator, comprising:
(a) a doll;
(b) a demand system within the doll for effecting a demand episode, including at least:
(i) a means for generating a perceptible demand signal; and
(ii) a means in communication with the demand signal generating means for arresting the demand signal in response to receipt of a satisfaction signal from a user; and
(c) a care-provider identification system within the doll, including at least
(i) a means for receiving an identification signal from a user, wherein the identification signal is different from the satisfaction signal, and
(ii) a means in communication with the identification-signal receiving means and the demand system effective for preventing arresting of the demand signal, even though the satisfaction signal has been received by the satisfaction signal receiving means, until the identification signal is received by the identification-signal receiving means.

74. An infant simulator, comprising:
(a) a doll;
(b) a demand system within the doll for effecting a demand episode, including at least:
    (i) a means for generating a perceptible demand signal;
    (ii) a means for receiving a satisfaction signal from a user; and
    (iii) a means for measuring and recording the duration of each demand episode measured from initial generation of the perceptible demand signal to receipt of the satisfaction signal by the satisfaction signal receiving means; and
(c) a care-provider identification system within the doll, including at least:
    (i) a means for receiving an identification signal from a user, wherein the identification signal is different from the satisfaction signal, and
    (ii) a means in communication with the identification-signal receiving means and the demand system effective for causing continued measuring of the duration of a demand episode, even though the satisfaction signal has been received by the satisfaction signal receiving means, unless the identification signal is received by the identification-signal receiving means after generation of the perceptible demand signal has been initiated.

75. The infant simulator of claim 73 or 74 further comprising a demand interval timer in communication with the demand signal generating means for initiating generation of the demand signal at intervals.

76. The infant simulator of claim 73 or 74 wherein the identification-signal receiving means comprises a voice recognition system.

77. The infant simulator of claim 73 or 74 wherein the identification-signal receiving means comprises a fingerprint recognition system.

78. The infant simulator of claim 73 or 74 wherein the identification-signal receiving means comprises a keyhole effective for transmitting the identification signal upon insertion of an identification key.

79. The infant simulator of claim 78 further comprising an identification key effective for transmitting the identification signal when inserted into the keyhole, wherein the identification key includes a means for attaching the identification key to a selected care-provider and a means for indicating detachment of the identification key from the selected care-provider.

80. An infant simulator, comprising:
(a) a doll; and
(b) a demand system within the doll for periodically effecting a demand episode, including at least:
    (i) a means for generating sequential perceptible demand signal;
    (ii) a means in communication with the demand signal generating means for inhibiting the demand signal in response to receipt of a satisfaction signal from a user;
    (iii) a demand interval timer in communication with the demand signal generating means for initiating generation of the demand signal at intervals;
    (iv) a means in communication with the demand interval timer for adjusting the actual duration or statistically probable duration of the time interval between the generation of sequential demand signals;
    (v) a demand duration timer in communication with the demand signal generating means for terminating generation of the demand signal at the end of a demand period;
    (vi) a means in communication with the demand duration timer for adjusting the actual duration or statistically probable duration of the demand period; and
    (vii) wherein adjustments in the duration of the time interval between the generation of sequential demand signals and the duration of the demand period are inversely related, such that an increase in one is accompanied by a decrease in the other.

81. The infant simulator of claim 80 wherein the demand interval duration-adjustment means is effective for adjusting the actual or potential time interval between the generation of sequential demand signals to one of at least three time interval options of short duration, average duration and long duration, whereby the infant simulator can be programmed to simulate the relative care requirements of an easy infant, an average infant and a difficult infant.

82. The infant simulator of claim 80 wherein the demand interval timer randomly generates sequential demand signals within a predetermined interval time range.

83. The infant simulator of claim 80 wherein the demand interval timer generates sequential demand signals on an fixed schedule selected from a plurality of fixed schedules.

84. The infant simulator of claim 80 wherein the demand period duration-adjustment means is effective for adjusting the demand period duration to one of at least three time period options of short duration, average duration and long duration, whereby the infant simulator can be programmed to simulate the relative care requirements of an easy infant, an average infant and a difficult infant.

85. The infant simulator of claim 80 wherein the demand period duration timer establishes the duration of a demand period as a random variable within a predetermined duration time range.

86. The infant simulator of claim 80 wherein the demand period duration timer establishes the duration of a demand period as a predetermined value.

87. An infant simulator, comprising:
(a) a doll;
(b) a diaper-change system within the doll for periodically effecting a diaper-change episode, including at least:
    (i) a means for generating a perceptible soiled-diaper signal; and
    (ii) a means in communication with the soiled-diaper signal generating means for arresting the soiled-diaper signal in response to receipt of a diaper-changed signal; and
(c) a diaper configured and arranged to be fitted over the lower torso of the doll as a diaper and having a means effective for transmitting the diaper-changed signal to the soiled-diaper signal arresting means when the diaper is fitted on the doll.

* * * * *